US006760746B1

(12) United States Patent
Schneider

(10) Patent No.: US 6,760,746 B1
(45) Date of Patent: Jul. 6, 2004

(54) METHOD, PRODUCT, AND APPARATUS FOR PROCESSING A DATA REQUEST

(76) Inventor: Eric Schneider, 13944 Cedar Rd. #258, University Hts., OH (US) 44118

( * ) Notice: Subject to any disclaimer, the term of this patent is extended or adjusted under 35 U.S.C. 154(b) by 712 days.

(21) Appl. No.: 09/653,100

(22) Filed: Aug. 31, 2000

(51) Int. Cl.[7] .............................................. G06F 13/00
(52) U.S. Cl. ...................................... 709/203; 709/217
(58) Field of Search ................................. 709/200, 201, 709/203, 217, 218, 219, 220, 221, 226, 229, 245

(56) References Cited

U.S. PATENT DOCUMENTS

| | | | |
|---|---|---|---|
| 5,778,367 A | 7/1998 | Wesinger, Jr. et al. | 707/10 |
| 5,881,131 A | 3/1999 | Farris et al. | 379/15.03 |
| 6,009,459 A | 12/1999 | Belfiore et al. | 709/203 |
| 6,205,139 B1 * | 3/2001 | Voit | 370/389 |
| 6,314,469 B1 * | 11/2001 | Tan et al. | 709/245 |

OTHER PUBLICATIONS

"Playing monopoly—despite government efforts to include more players, network Solutions still dominates the business of registering domain names", wasserman, Elizabeth, The Industry Standard, Jan. 25, 1999, p31, 1 page.*

* cited by examiner

*Primary Examiner*—Moustafa M. Meky

(57) ABSTRACT

When a first data request having a first identifier and a first request type is received, it may be determined whether the first data request can be processed. The first data request may be processed upon determining that the first data request can be processed. The correspondence between identifiers and request types may be one-to-one, one-to-many, many-to-one, or many-to-many relationship. When the first data request can not be processed, a response type having a response method may be selected that may generate a second identifier and/or select a second request type. A second request type may correspond to the first identifier and the second identifier may correspond to the first request type. When a response type is selected, a second data request corresponding to the selected response type may be generated. The second data request may then be processed. A response type may employ a plurality of response methods to access multiple network resources corresponding to any generated and/or selected identifiers and/or request types.

35 Claims, 32 Drawing Sheets

From 260
Domain name
resolvable? - No
↓ 410

Process
domain name
as registration
request

↓

End

*Fig. 4a*

From 260
Domain name
resolvable? - No
↓ 415

Error message including hyperlink(s)
to perform a WHOIS request and/or
process domain name as a search,
commerce, and/or registration request

↓

End

*Fig. 4b*

To 222
Provide results
if any

↑ Yes   242

From 234
Input
a valid
URI? - Yes → URI accessible? →No→ 425

Select URI by applying a spell check
program on URI and/or finding
similar URIs from input history

↓ 430

Generate a valid URI to access content
by extracting keywords from the non-
query components of the previous
inaccessible URI and using such
keywords as a search request or as the
query portion of the generated valid URI

↓ 435

Select ad that corresponds to the
extracted keywords and/or create ad
having available domain names that
are generated from forming
extracted keyword combinations
including prefixes and/or suffixes To 222
Error
Message ←Yes— Too many attempts? 440
         No ↑

*Fig. 4c*

Configuration Settings — 174

General Features — 504

[X] Select Registrar

[X] Select Search Engine

[X] Enable Prefix

[X] Enable Metalinks

[X] Enable Watch List

Enhanced (Auto)search features — 506

[X] Generate DNs from keywords

[X] Register Input when available

Enhanced registration features — 508

[X] Also provide search results

[X] Also provide resource location

*Fig. 5*

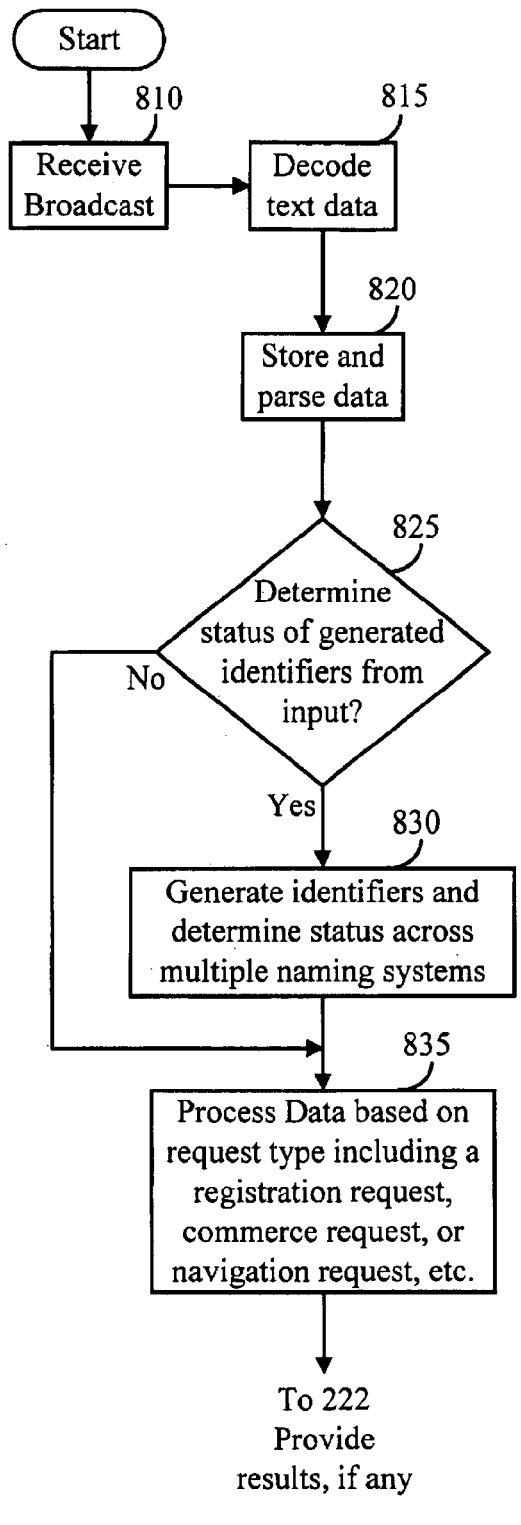
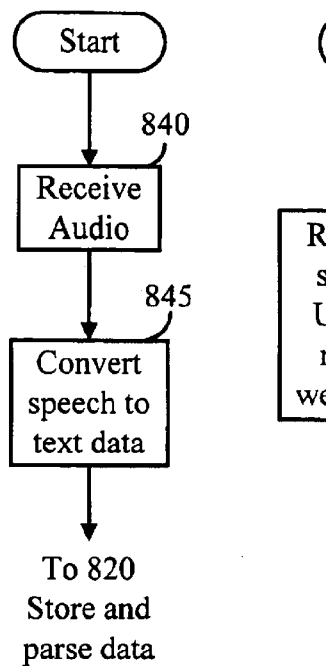
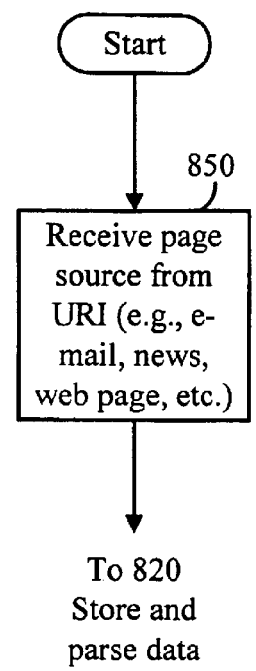
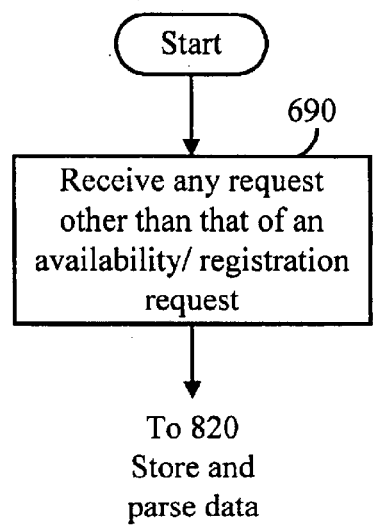
Fig. 8a
Fig. 8b
Fig. 8c
Fig. 8d

UNames Identifier Registration Form

Congratulations!! example.com is available for registration.   1050
Please provide your Registrant information by clicking here!!

Below is a list of other identifiers that are currently available.
Please select which identifiers that you would like to register.

- X   example.com
- ___  example.sitemap
- X   example.411
- ___  example.news   1055
- X   exampleco
- ___  1-800-example Please provide any keywords or descriptors that you would like to put in your watch list so that we may be able to inform you of any available identifiers that may become available in the future.

By using the watch list you may also stay current on what identifiers your competition may be registering.

Enter the identifiers that are registered by your competitors and enter any geographic, psychographic, and/or demographic information here including any keywords of interest for yourself and your competition.

1060

News
Stories

1065

Click here to receive any suggested identifiers based on your registrant information and/or any selected categories of interest to help make your watch list selection.

( Submit )  ( Reset )

*Fig. 10c*

UNames Identifier SignUp Form

Dear potential registrant,

Unfortunately, finding an available domain name is a labor intensive process. When U are ready to register, there is a lot of information needed from U to complete your registration request. Too often, customers may not have the extra time to fill out all of this information at the point of registration.

By filling out your contact and billing information in advance, we can minimize both your time and the information needed from U at the point of registering your domain name while educating you as to our company and a variety of strategies that U can use in finding a domain name that you're interested in.

In addition, we have other programs such as our Watch list program, Tell-a-Friend program, and our gift certificate program. For instance, until January 2000 a registrant had to purchase a domain name for a minimum of 2 years for an average price of $70 making it generally unfeasible to offer a gift certificate program such as this one.

Since January, and due to competition in price. Domain names may be purchased for as little as $20 for a single year making it feasible for the first time to offer a widespread domain name gift certificate program.

Remember U can also take advantage of our watch list program by entering the names that are registered by your competitors and enter any geographic, psychographic, and/or demographic information here including any keywords of interest for yourself and your competition.

Click here to provide or receive any suggested names based on your registrant information, competitors, and/or any selected categories of interest to help make your watch list selection.

Please provide your Registrant information by clicking here!!
Click here to purchase a Gift Certificate
To tell a friend about our signup form that saves time, click here!
Click here to get started with your own watch list!
Ready to find a domain name NOW?? then Click here

*Fig. 10d*

METHOD, PRODUCT, AND APPARATUS FOR PROCESSING A DATA REQUEST

Related APPLICATIONS

This application claims the benefit of the following patent applications, which are hereby incorporated by reference:

U.S. patent application Ser. No. 09/650,827 filed Aug. 30, 2000, U.S. patent application Ser. No. 09/644,587 filed Aug. 23, 2000, U.S. patent application Ser. No. 09/643,584 filed Aug. 22, 2000, U.S. patent application Ser. No. 09/598,134 filed Jun. 21, 2000, PCT Application No. 00/10883 filed Apr. 20, 2000, U.S. patent application Ser. No. 09/532,500 filed Mar. 21, 2000, U.S. patent application Ser. No. 09/525,350 filed Mar. 15, 2000, U.S. provisional application Ser. No. 60/175,825 filed Jan. 13, 2000, U.S. patent application Ser. No. 09/440,606 filed Nov. 15, 1999, U.S. patent application Ser. No. 60/157,075 filed Oct. 1, 1999, U.S. patent application Ser. No. 60/153,594 filed Sep. 13, 1999, U.S. patent application Ser. No. 60/153,336 filed Sep. 10, 1999, and U.S. provisional application Ser. No. 60/152,015 filed Sep. 1, 1999.

FIELD OF THE INVENTION

This invention generally relates to data request integration, and more specifically relates to a method, product, and apparatus for integrating navigation services, resolution services, registration services, and search services of valid and fictitious identifiers across naming systems.

BACKGROUND OF THE INVENTION

In the same way that a street address represents a location in the physical world, a domain name can be used to represent a location on the Internet. In the physical world, one relies on both street addresses and the postal system to send information back and forth between individuals and organizations. On the Internet, one relies on the Domain Name System (DNS) to translate domain names into Internet addresses.

In general, names are thought of as discrete emblems used to establish or designate identity; addresses are thought of as emblems designating location. Domain names might seem to be unusual because they appear to be both names and addresses; they both locate and identify Internet resources. Yet people's personal names, for example, establish identity, and such identifiers travel with the individual rather than changing when the person changes location. Street addresses or geographic names, by contrast, are more static in order to establish location. Yet such addresses and geographic names also serve to identify the physical place, differentiating it from other places.

Geographic names of all kinds—street addresses, zip codes, counties—are in fact overlays on an unchanging numerical system of longitude and latitude, which is a universally recognized designator and locator for a particular place on the earth's surface. In this sense, geographic names are much like Internet domain names, which are an overlay of Internet address number designations.

Name space is a set of names in which all names are unique. Address space is a set of addresses in which all addresses are unique. Names are commonly used as mnemonic devices to help remember information. For instance, names are used to remember telephone numbers, and domain names are used to remember Internet addresses. A recent area of worldwide concern is the allocation of name space on the Internet.

The Internet is a vast computer network having many smaller networks that span the world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may provide the data and a client computer may display or process it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

Client side browsers, such as Netscape Navigator and/or Microsoft Internet Explorer (MSIE) provide graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side browser reads these codes in order to display the page. A web page may be static and requires no variables to display information or link to other predetermined web pages. A web page is dynamic when arguments are passed which are either hidden in the web page or entered from a client browser to supply the necessary inputs displayed on the web page. Common Gateway Interface (CGI) is a standard for running external programs from a web server. CGI specifies how to pass arguments to the executing program as part of the HTTP server request. Commonly, a CGI script may take the name and value arguments from an input form of a first web page which is be used as a query to access a database server and generate an HTML web page with customized data results as output that is passed back to the client browser for display.

The Web is a means of accessing information on the Internet that allows a user to "surf the web" and navigate the Internet resources intuitively, without technical knowledge. The Web dispenses with command-line utilities, which typically require a user to transmit sets of commands to communicate with an Internet server. Instead, the Web is made up of millions of interconnected web pages, or documents, which may be displayed on a computer monitor. Hosts running special servers provide the Web pages. Software that runs these Web servers is relatively simple and is available on a wide range of computer platforms including PC's. Equally available is a form of client software, known as a Web browser, which is used to display Web pages as well as traditional non-Web files on the client system.

A network resource identifier such as a Uniform Resource Identifier (URI) is a compact string of characters for identifying an abstract or physical resource. URIs are the generic set of all names and addresses that refer to objects on the Internet. URIs that refer to objects accessed with existing protocols are known as Uniform Resource Locators (URLs).

A URL is the address of a file accessible on the Internet. The URL contains the name of the protocol required to access the resource, a domain name, or IP address that identifies a specific computer on the Internet, and a hierarchical description of a file location on the computer. For example the URL "http://www.example.com/index.html", where "http" is the scheme or protocol, "www.example.com" is the Fully Qualified Domain Name (FQDN), and "index.html" is the filename located on the server.

Because an Internet address is a relatively long string of numbers (e.g., 31.41.59.26) that is difficult to remember, Internet users rely on domain names, memorable and sometimes catchy words corresponding to these numbers, in order to use electronic mail (e-mail) and to connect to Internet sites on the Web. The Domain Name System (DNS) is a set of protocols and services on a network that allows users to utilize domain names when looking for other hosts (e.g., computers) on the network. The DNS is composed of a distributed database of names. The names in the DNS database establish a logical tree structure called the domain name space. Each node or domain in the domain name space is named and may contain subdomains. Domains and subdomains are grouped into zones to allow for distributed administration of the name space.

The DNS provides a mechanism so backup databases may be identified in case the first one becomes unavailable. DNS databases are updated automatically so that information on one name server does not remain out-of-date for long. A client of the DNS is called a resolver; resolvers are typically located in the application layer of the networking software of each TCP/IP capable machine. Users typically do not interact directly with the resolver. Resolvers query the DNS by directing queries at name servers, which contain parts of the distributed database that is accessed by using the DNS protocols to translate domain names into IP addresses needed for transmission of information across the network.

The Berkeley Internet Name Domain (BIND) may implement an Internet name server running UNIX type operating system. The BIND consists of a name server and a resolver library. BIND is fully integrated into UNIX network programs for use in storing and retrieving host names and addresses by calling a routine from the resolver library called gethostbyname( ) which returns the IP address corresponding to a given Internet host name. Error return status from gethostbyname( ) is indicated by return of a NULL pointer.

For instance, at the heart of Netscape client products lies the Netscape Network Library (netlib). A necessity of any network based client browser application is to send and receive data over a connection. This is accomplished in netlib by making a call to NET_GetURL( ). Among NET_GetURL( )'s arguments is a URL_Struct which contains the actual URL to be retrieved. When a call to NET_GetURL( ) is made, a connection is established between the client making the request and the host machine named in the URL, a request is sent in a particular format specified by the protocol (e.g., http, ftp), and data is received by the client, from the host machine.

In order to resolve host names, netlib uses a standard DNS lookup mechanism. NET_FindAddress( ) makes the gethostbyname( ) call to lookup the IP address for the specified host from a DNS database stored on a DNS server, and is called from NET_BeginConnect( ). If a numeric IP address is passed into NET_FindAddress( ), it is passed directly into the gethostbyname( ) call which will always return success when an IP address is passed in. NET_FindAddress( ) is actually called repeatedly until it returns success or failure. Upon success the host entity struct is filled out, and cached. Upon failure, the host entity struct is freed and the "not found" result is passed back to the caller.

A domain name consists of two parts: a host and a domain. Technically, the letters to the right of the "dot" (e.g., gen-eric.com) are referred to as Top Level Domains (TLDs), while hosts, computers with assigned IP addresses that are listed in specific TLD registries are known as second-level domains (SLDs). For the domain name "gen-eric.com", ".com" is the TLD, and "gen-eric" is the SLD. Domain name space is the ordered hierarchical set of all possible domain names either in use or to be used for locating an IP address on the Internet. TLDs are known as top-level domains because they comprise the highest-order name space available on the Internet. Second-level domains, as well as third-level domains (3LDs) such as "eric.gen-eric.com", are subsidiary to TLDs in the hierarchy of the Internet's DNS.

There are two types of top-level domains, generic and country code. Generic top-level domains (gTLDs) were created to allocate resources to the growing community of institutional networks, while country code top-level domains (ccTLDs) were created for use by each individual country, as deemed necessary. More than 240 national, or country-code TLDs (e.g., United States (.us), Japan (.jp), Germany (.de), etc.) are administered by their corresponding governments, or by private entities with the appropriate national government's acquiescence. A small set of gTLDs does not carry any national identifier, but denote the intended function of that portion of the domain space. For example, ".corn" was established for commercial networks, ".org" for not-for-profit organizations, and ".net" for network gateways. The set of gTLDs was established early in the history of the DNS and has not been changed or augmented in recent years (COM, ORG, GOV, and MIL were created by January 1985, NET in July 1985, and INT was added in November 1988).

The DNS is operated by a Network Information Center (NIC) in each country to act as authority for administering the respective ccTLD zone file portion of the DNS database. The Internet Network Information Center (InterNIC) previously administered by the National Science Foundation (NSF), was formed to preside as authority over the gTLD zone files. In 1993, InterNIC was privatized and Network Solutions Inc. (NSI) was chosen to perform the registration and propagation of these key gTLDs, under a five-year cooperative agreement with the NSF.

Most recently, NSI and officials from the Department of Commerce's National Telecommunications and Information Administration (NTIA) have agreed to a two-year extension of their Cooperative Agreement through Sep. 30, 2000. Included in the extension are provisions to transfer relevant US Government authority over some domain name system functions to a new non-profit corporation. Incorporated and headquartered in California, the Internet Corporation for Assigned Names and Numbers (ICANN) is the non-profit corporation that was formed to take over responsibility for the IP address space allocation, protocol parameter assignment, domain name system management, and root server system management functions now performed under U.S. Government contract by Internet Assigned Numbers Authority (IANA) and other entities. The IANA, also headquartered in California, is the overall authority for day-to-day administration of the DNS. IANA staff carries out administrative responsibilities for the assignment of IP Addresses, Autonomous System Numbers, TLDs, and other unique parameters of the DNS and its protocols.

ICANN, NTIA, and NSI agreed to a migration to a shared registration system (SRS) in a phased approach beginning Mar. 31, 1999 with full implementation by Jun. 1, 1999. NSI has implemented a SRS to support multiple licensed, accredited registrars offering registration services. NSI and other domain name registrars function as retailers of domain name registration services through NSI's SRS. NSI will also continue in its role as the registry or wholesaler of ".com", ".net", and ".org" domain name registrations. To date, NSI has registered more than 11,000,000 domain names, or SLDs, in ".com", ".net", ".org", and ".edu".

Domain name registration for a given NIC authority may be accessed by a TCP/IP application called WHOIS, which queries a NIC database to find the name of network and system administrators, system and network points-of-contact, and other individuals who are registered in appropriate databases. Domain names are identifiers used for accessing a resource and retrieving contact information of the registrant or domain name holder of that resource. The availability of a domain name from a NIC authority for a given TLD may be determined by submitting a WHOIS request. When no match in the respective WHOIS database is found, then the domain name is most probably available for registration. Regional WHOIS registries are maintained by NSI and ARIN (American Registry for Internet Numbers) located in the U.S., APNIC (Asia-Pacific Network Information Center) located in Australia, and RIPE NCC located in the Netherlands.

DNS supports only name resolution services rather than directory or registration services. Resource location is determined by resolving a query in the DNS and domain name availability is determined by using a WHOIS service to query an appropriate NIC database. Until Spring 1999, NSI managed a single centralized WHOIS database for gTLDs. Each ICANN accredited registrar has the right to populate and maintain their own WHOIS database. Since June 1999, the WHOIS database has become distributed, similar to that of the DNS. All WHOIS requests query a server located at "whois.internic.net" to determine which accredited registrar's WHOIS server to retrieve contact information from. There is no evidence of new technologies or services that have arisen in response to the introduction of such distributed WHOIS services.

Each day hundreds of thousands of users are connecting to the Internet for the first time. These first time users are already familiar with the concept of a domain name or web address such as "example.com" or a URL such as "http://www.example.com/index.html" because of their contact with the myriad of advertisements in print, radio, and television. Because the navigation of network resources is left up to the user, it is quite often that a user may enter a descriptive word and concatenate a TLD such as ".com" to it, forming a domain name with the hope of finding information relating to the descriptive word. When a desired resource such as a web page can not be accessed after entering a domain name or URL in the command line of a device or the location field of a web browser, novice users of the Internet may assume that the resource does not exist and the domain name of such resource is available to the user for registration. This is a common mistake. Availability of a domain name is determined by performing a WHOIS request, which remains a separate standalone service.

A growing set of tools and services have enabled users to choose many techniques suited for improved navigation and access to content on a network such as the Internet. Different services are used to access desired content. There are resolution services for the DNS, which receives a domain name (e.g., "example.com) from a client for translation into an IP address to access the resources of a specific network addressable device (e.g., web server) on a network such as the Internet. The function of translating a domain name into a corresponding IP address is known as name resolution. Name resolution is performed by a distributed system of name servers that run specialized software known as resolvers to fulfill the resource location request of the client by the successive hierarchical querying of the resource records from zone files.

There are registration services such as the registration of domain names. Domain names are identifiers used for accessing resources and retrieving registrant domain name information. Resource location of a domain name may be determined by resolving a DNS query and domain name availability may be determined by using a WHOIS service to query an appropriate NIC database. There are search services to access searchable databases of network resources that are relied upon daily by millions of users. When a client system receives a search request, a query may be sent to a server connected to the Internet to retrieve Uniform Resource Locators (URLs) that satisfy the search request. Web page results are typically generated and displayed to the client in a batch of hyperlinks that access network resources.

In general, these areas remain as separate services and only a few examples may be demonstrated with respect to the integration of these separate areas. For instance, steps for integration of services have been demonstrated in U.S. Provisional Application Ser. No. 60/130,136 filed Apr. 20, 1999, by Schneider entitled "Method and system for integrating resource location and registration services", U.S. Provisional Application Ser. No. 60/160,125 filed Oct. 18, 1999, by Schneider, entitled "Method and system for integrating resource location, search services, and registration services", and U.S. patent application Ser. No. 09/525,350 filed Mar. 15, 2000, by Schneider, entitled "Method for integrating domain name registration with domain name resolution."

U.S. Pat. No. 5,778,367 issued on Jul. 7, 1998 by Wesinger Jr., et al., entitled, "Automated on-line information service and directory, particularly for the world wide web" provides a graphical front end to the WHOIS database, with additional hypertext link integration. Links are embedded in the results such that, clicking on a specific result, WHOIS is queried once again with respect to the selected information. This action would produce the same result as if the user had copied down the selected information, navigated to WHOIS and entered the selected information in the lookup field. The '367 patent automates the WHOIS tool with respect to itself and does not consider automating extended functions of resolution requests or search requests to access other network resources.

Due to domain name registration growth, it requires more labor to find a desirable domain name that is available. As a result companies such as Oingo, Inc., for example, now provide domain name variation services that help registrars increase domain name sales by identifying and suggesting words and phrases related in meaning to the terms sought to be registered. Other improvements to registration services include generating permutations of available domain names in response to supplying a plurality of keywords as a part of a registration request. Though these registration tools have helped growth in registration volume, tools having such name generating features have not been integrated into other types of requests or services (e.g., autosearch feature, search box, streaming data, custom toolbar, personal web assistant, browser plug-in, instant messaging, IRC chat, web conferencing, standalone search/navigation applications, etc.). Currently, domain names are registered by initiating a registration request. There are no services that perform registration requests in response to initiating other request types (e.g., navigation request, search request, resolution request, commerce request, reference request, etc.), nor are other request types performed in response to an initiated registration request.

Resolution requests are most commonly generated in response to input provided to the location field of a web browser. Entering a URL in the location field serves as a means to access content from that URL. Because the location field is critical for accessing resources, the design of such location fields have rivaled much competition and innovation between existing web browser products from companies such as Netscape and Microsoft. Improvements to better track and organize sites of URLs that users have visited such as Bookmark folders, URL history, and the personal toolbar are all examples of functionality designed to help users navigate. Other improvements include spell checking and an autocomplete feature from the URL history as text is entered into the location field.

A more recent feature called Smart Browsing is integrated into Netscape Navigator that uses Internet Keywords so users may streamline the use of URLs and get fast access to web sites using the browser's location field. Any single or multiword strings typed into the browser's location field that does not include a"." are sent via HTTP to a server at "netscape.com". The keyword server pulls the string and compares it to several separate lists of keyword-URL pairs. If the keyword system finds a match, it redirects the user's browser to the URL of the keyword-URL pair. Failing a match against the lists, the user's browser is redirected to a Netscape Search page with the typed string as the search query. The "." versus " " is a key factor in determining what services are used. The detection of a "." implies a domain name whereas the detection of a " " implies a search request.

The autosearch feature of Microsoft Internet Explorer (MSIE) is another example of an improvement to the location field of a web browser. The details of the autosearch feature is disclosed in U.S. Pat. No. 6,009,459 issued on Dec. 28, 1999 by Belfiore, et al., entitled, "Intelligent automatic searching for resources in a distributed environment." The '459 patent specifies a mechanism for a computer system to automatically and intelligently determine what a user intended when the user entered text within the location field of a web browser. Often users improperly enter URLs or enter search terms in a user interface element that requires URLs. If the user enters text that is not a URL, the system may first try to construct a valid URL from the user-entered text. If a valid URL can not be constructed, the browser then automatically formats a search engine query using the user-entered text and forwards the query to an Internet search engine.

In addition, the '459 patent specifies a template registry that categorizes the specific suitability of a plurality of search engines to locate web sites related to a determined meaning of the specified text. The template is an entry in the registry that includes replaceable characters that may be replaced with the processed text. An example template registry entry that causes the Yahoo! search engine to be called is "http://msie.yahoo.com/autosearch?%s". The % s is filled in with information regarding the search terms.

Furthermore, the '459 patent specifies a method which provides for automatically deleting prefix terms from input that are identified as not necessary to perform a search based on the determined meaning of the entered input. Directive terms such as "go" or "find" followed by search terms may be entered within the location field. Such users intend for the web browser to locate web pages that are identified by terms within the text. As the directive terms do not contain content that is useful in conducting a search, these prefix terms are dropped from the text. Though prefixes may help process keywords in a more specific way, there are no such prefixes in use for specifying how domain names may be processed through a user interface element used for search requests, resolution requests, and registration requests. For example, search engine web sites have specified a list of prefixes to assist in performing a more specific search request. Any such prefixes have no relevance to domain names [e.g., valid domain names (VDNs), fictitious domain names (FDNs), and multilingual domain names (MDNs)] but to that of keywords and phrases. In addition, any keywords or phrases processed by the Autosearch feature are not used for other functions or procedures other than that of a search request.

There have been advances with respect to submitting keyword search requests to search engines. RealNames and other companies like Netword use plain language as a means for resource location and have developed their own version of resolution services. Using simplified network addresses in the form of keywords/phrases as opposed to the conventional form of URLs in the DNS, offers the possibility to further contemplate the differences between search requests and resource location. Though an observable fact, little if any has been done to provide integration tools to support these differences. To date, the only advancement demonstrated are the partnerships made with RealNames and different portal web sites. When a search request is performed, input may be forwarded to a RealNames server concurrent with the original search request and if there are any matches, the first result displayed may be a registered RealName which links to a registered web site followed by displaying the search results from the search request.

Though RealNames demonstrates using keywords and phrases from a search request for resource location, there are no methods for detecting a domain name or URL as input from a search request. In effect, a domain name is processed as a literal string or keyword. For example, when a popular web site such as "news.com" is processed from input there is a high probability that the URL "http://news.com" would be displayed as a first link or first few links from the search results. There are no systems/services that guarantee the provision of such a URL as a first link. When a domain name is reserved and has no web site or the domain name corresponds to a web site with little traffic (e.g., web pages having no META tags, etc.), there are no search results, and in turn, no hyperlinks are displayed. This observation is apparent upon surveying the search results of hundreds of search engines and other products/services such as browser plug-ins, custom toolbars, instant messaging (e.g., AIM, ICQ), etc., which clearly indicate that a domain name is processed as a literal string only without consideration for processing input in any way aside from that of a search request. There have been some improvements by providing links to other vendors such as processing the search request and responding with links for a book search at "amazon.com" or a reference search at "dictionary.com" and the like, but there are no such links that provide vendor domain name related services or online identity services in response to a search request.

FIG. 1a depicts a typical output from a search portal web site for the input "zipnames.com". Results such as "found no document matching your query" are returned to the output and hyperlinks that use the input as a search request from another URL are generated and displayed. Such links may redirect to shopping sites and reference sites or to other search engines. It is clear that no provisions have been made to detect the presence of a domain name before or while processing the search request.

If a search request may detect that a domain name is processed as is and/or as a network address then steps of resource location and the use of resolution services or registration services may be made in addition to the search request. No search engines or existing services make use of the "." delimiter to extend searching when processing resolution and/or registration services. Any results that are returned from a search request are based on finding a database match to the domain name as a keyword or literal string. Currently, there are no search engines or resources that generate a link for WHOIS results in response to receiving a network address such as a domain name, FQDN, or URL and may be listed or redirected as part of search results.

Flyswat, Inc., GuruNet Corporation, Third Voice, Inc., Zapper Technologies, Inc., and Annotate.net, Inc. are other companies fundamentally changing the search and navigation category through the development of information delivery service that allow users to quickly connect to a broad array of sources for both information and commerce. For instance, Flyswat is a leading navigation service that turns any word on a computer screen into a link to additional information. Flyswat provides a downloadable utility that identifies and automatically hyperlinks the existing words or phrases in any Web page, enabling users to retrieve relevant information and services simply by clicking on these terms. The Flyswat service also is compatible with any desktop application, such as word processing, spreadsheets, slideshow presentations and more. When users click on words in their personal documents and Web pages, a small window appears presenting definitions, related content and e-commerce service links, news headlines, stock listings, shopping opportunities, or any other relevant information from content providers. Though these navigation service providers integrate their technology with computer applications, none of these providers have yet integrated their services with interactive television applications.

FIGS. 1b–1h depict typical output screens from the Flyswat product. In FIG. 1b, a web page is retrieved having test data 50. Flyswat is used to activate a line of test data 50 called "www.tesfly2". Flyswat detects the "www" and in response, unsuccessfully performs a resolution request shown in the location field 54. However, in FIG. 1c, when Flyswat is used to activate a line of test data 50 called "testfly.com", a pop-up box 58 is displayed listing a link for the definition of the word "testfly" demonstrating that the Flyswat product does not have the ability to detect the presence of a domain name. In FIG. 1d, Flyswat is used to activate a line of test data 50 called "ftp.testfly3.com" and in FIG. 1e, Flyswat is used to activate a line of test data 50 called "www2.testfly4.com". In both cases, a pop-up box 58 is displayed listing a definition link instead of performing a resolution request or any other kind of request. In FIG. 1f Flyswat is used to activate a line of test data 50 called "test@testfly5.com" and in FIG. 1g, Flyswat is used to activate a line of test data 50 called "216-231-1234". Yet again, a pop-up box 58 is displayed listing a definition link demonstrating that the Flyswat product does not have the ability to detect the presence of an e-mail address or telephone number. In FIG. 1h, when Flyswat is used to activate a line of test data 50 called "Isthiskeywordregistered", a pop-up box 58 is displayed listing a definition link, but no links are provided for neither determining whether the line of test data is a registered keyword nor a link for accessing registration services.

FIGS. 1i–1j depict typical output screens from the GuruNet product. In FIG. 1i, when GuruNet is used to activate a line of test data 50 called "testfly.com", a pop-up box 58 is displayed listing that no match has been found for "testfly.com" demonstrating that the GuruNet product nor any partnered search engines does not have the ability to detect the presence of a domain name. GuruNet has partnered with RealNames enabling users to place their cursor on a word or phrase, hold down the ALT key and click. GuruNet then displays an unobtrusive pop-up box that shows content related to the word or phrase selected, including the RealNames Internet Keywords associated with the term. However, in FIG. 1j, when GuruNet is used to activate a line of test data 50 called "Isthiskeywordregistered", a pop-up box 58 is displayed listing that no match has been found, indicating that the line of test data is not a registered keyword nor are any links provided for accessing registration services for registering the unregistered keyword.

A system or process is typically modeled by defining the elements or components within such a system and further defining the corresponding relationships of such elements with each other and/or the relationships of such elements to other systems and their respective elements. Elements or components are most typically defined as objects having properties or functions associated with such objects. Objects are distinguished by assigning a unique identifier for each object creating an object space. Identifiers are symbols, markings, characters, names, or labels used for distinguishing, tracking, tagging, coding, sorting, routing, locating, linking, and organizing any combination of objects, resources, and addresses of a given system or across multiple systems. Indicia are identifiers used for referencing objects of physical or abstract resources. An identifier is static and has a persistence that usually takes the form of a name or label to help people remember and commonly agree upon the identification of an object for a given system. In effect, for any given object space there is typically defined an associated naming system. Each naming system may include one or more namespaces. In some naming systems, identifiers may be allocated, assigned, reserved, subscribed, or registered to an object or entity such as an individual or organization. Examples of such registered identifiers include Social Security Numbers (SSN), license plate numbers, Universal Product Codes (UPC), International Standard Book Numbers (ISBN), trademarks, tradenames, company names, stock symbols, broadcast station call letters, telephone numbers, domain names, keywords, FDNs, screen names, user names, etc.

Each naming system has respectively originated and evolved for its own reasons, in its own way and in its own time. Identifiers take on meaning only from within its own naming system and generally remains exclusive to other naming systems. In recent years, identifiers are beginning to persist across other naming systems. For instance, there is a recent correlation between telephone numbers and trademarks. During the early 1970's, as 1-800 toll free numbers were introduced, industry recognized and extended the use of mnemonics for commercial advertising and name branding. During the 1980's, 1-800 names were popularized to the point where brokers would buy names with the hope of selling or leasing the 1-800 names from their growing portfolio. In fact, courts have almost unanimously held that telephone mnemonics may be protected as trademarks.

Another area of crossover is with respect to trademarks and domain names. Historically, Internet domain names were assigned on a "first come, first serve" basis. On the Internet, until very recently, no trademark searches are done, and unlike other computer networks, no central authority exists. Due to recent trademark infringement controversies, applications for domain names now require applicants to state that they have a commercial right to use the applied for name. It is clearly evident that the assignment and management of identifiers, for example, domain names, is important. Efficient methods of implementing a process for the assignment of domain names is of paramount importance. As a result, there have been some services that have incorporated the extra step of searching for trademark conflicts prior to the registration of a domain name. Services of this nature may be found at web addresses such as "http://www.thomson-thomson .com" or "http://nameprotect.com".

U.S. Pat. No. 5,881,131 issued on Mar. 9, 1999 by Farris, et al., entitled, "Analysis and validation system for provisioning network related facilities" discloses a service order processing system which determines a service request is provisionable and automatically provisions customer facilities including at least one of a domain name, a user name, a customer network address, and an electronic mail address, to execute the service request based upon information stored by the service order processing system. In addition, the '131 patent discloses a system to access various trademark/tradename databases for determining any trademark conflicts with respect domain name availability. Such a system is used to provision physical network facilities as well as logical network facilities, such as identification related data, electronic mail, user name, domain name, and the like. Though the system contemplates the provisioning of identifiers for different naming systems, there is no mention or teaching of provisioning identifiers that intentionally have a specific correlation or connection to each other in order to help create a more unified identity across multiple naming systems.

WIPO Patent Application Serial WO9909726A1 published on Feb. 25, 1999 by Broadhurst, entitled, "Method of determining unavailability of internet domain names" discloses an improved query server that overcomes the shortcomings of existing domain name searching techniques by performing a multitude of searches simultaneously, transparent to the user. Specifically, the improved query server searches for existing domain name records in various domains and then displays the results in a formatted manner, thus eliminating the need for a user to perform individual searches. However, such techniques of finding similar identifiers are applied to the DNS only, which is a single naming system and does not consider multiple naming systems.

U.S. provisional patent application Ser. No. 60/157,075 filed Oct. 1, 1999, by Schneider, entitled "Method and apparatus for integrating resource location and registration services of valid and fictitious domain names" discloses a robust system for managing both the resolution and registration of domain names having either a TLD or a TLDA. However, there is no mention in the specification of the simultaneous registration of an identifier that can have both a TLD and TLDA. RealNames Corporation and other companies like Netword, Inc. use plain language as a means for resource location and have developed their own version of resolution services by administering a keyword registry. Through partnerships and distribution channels, many web sites offer the possibility of searching for or even registering either a RealNames "Internet Keyword" or a domain name. But none of these sites integrate these separate services to determine the simultaneous availability and/or registration of such similar identifiers across plural naming systems.

To date, the determination of the availability and/or registration of similar identifiers across naming systems have never been specified leaving the availability and/or registration of such identifiers as steps to be determined independently. New utility can be demonstrated by combining the simultaneous registration across naming systems. Accordingly, in light of the above, there is a strong need in the art for a method and apparatus for determining the availability of similar identifiers across naming systems.

Though co-pending application Ser. No. 60/130,136 (now abandoned) solves the problem of integrating resource location and registration services, the subject matter pertains to valid domain names only [e.g., a domain name having a TLD or resolvable highest level domain (HLD)]. Though other applications Ser. Nos. (60/125,531; 60/135,751; 60/143,859 [now abandoned]) enable the use of resolving FDNs (e.g., a domain name having an unresolvable HLD or top level domain alias (TLDA), fictitious indicia of the minimum form "A.B", etc.) the subject matter presents resource location and registration integration, that pertain to fictitious domain names only. Resource location and registration for valid domain names versus fictitious domain names have remained separate systems each with its own exclusive functionality. New utility can be demonstrated by combining these separate systems.

Accordingly, in light of the above, there is a strong need in the art for a system and method for integrating resource location and registration services for both valid and fictitious domain names. In addition navigation services, search services, resolution services, and registration services have remained as separate services. New utility can be demonstrated by combining these separate services into a unified service. Accordingly, in light of the above, there is a strong need in the art for a method, product, and apparatus for processing a data request while integrating navigation services, resolution services, search services, and registration services of valid and fictitious identifiers across naming systems.

SUMMARY OF THE INVENTION

The present invention assures that a response type may be automatically selected when a data request cannot be processed. The invention integrates the processing of fictitious domain names, valid domain names, multilingual domain names, resolvable domain names, available domain names, and/or keywords/phrases with prefixes, spelling, input history, multiple identifiers, search requests including Autosearch, registration and other request types. The present invention provides an error message that is more specific in response to trying to locate an invalid domain name, invalid IP address, or a valid domain name determined unresolvable.

The invention may use a template of the MSIE autosearch feature for the purposes of name generation and registration rather than purpose of searching in lieu of making browser modifications resulting in the savings of distribution costs for software updates. The present invention generates and displays at least one hyperlink at the top of standard search results where the link may access a URI or NIC registration of an available domain name in the form of "keyword.TLD". The invention assists users in selecting vendors or portals across separate systems and combine results from each service into a unified result through a metaportal.

The present invention allows portions of a URI to be used as a search request to select advertising. The invention assists providers with name generation and the suggestive selling of identifiers. The present invention enables banner ads to be populated with available identifiers in real time. The invention provides the option of displaying a hyperlink instead of an identifier status region and have more display space on a web site available for other uses such as generating revenue from other content such as banner ads and news.

The present invention detects and/or generates identifiers in response to real-time data streams from input sources such as instant messaging, chat rooms, web conferencing, interactive television, of from any broadcast. The invention helps unify a continuous identity by concurrently registering the same identifier and/or similar identifiers across a plurality of separate namespaces or naming systems. The present invention provides the user with the ability to create a profile or identifier watch list while registering an available identifier. The invention enables users to sign-up registrant information, in advance to minimize the information needed from the registrant at the point of registration. The present invention enables users to buy gift certificates and tell a friend about the sign-up program.

The invention provides for the transmission and propagation of identifiers having an available status throughout a series a distributed hierarchical identifier status caches. The present invention enables an identifier status cache to provide a real-time dynamic content stream for news, banner ads, ticker tape, and the like. The invention enables distributed WHOIS caches to be distributed in a manner similar to the DNS for reduced bandwidth and increased lookup performance.

In general, in accordance with the present invention a method for processing a first data request having a first identifier and a first request type includes the steps of determining whether the first data request can be processed from the first identifier and the first request type, processing the first data request in response to determining that the first data request can be processed, selecting a response type in response to determining that the first data request can not be processed, generating a second data request that can be processed in response to selecting the response type, and processing the second data request in response to generating the second data request.

In addition, the second data request may correspond to the first data request. The response type may include a first response method having the first identifier and a second request type and/or a second response method having a second identifier and the first request type. The response type may automatically determine whether to select the first response method or select the second response method. The second request type may correspond to the first identifier so that the second data request can be generated and processed from the first response method. The second response method may further include generating the second identifier so that it corresponds to the first request type. The second data request may also be generated and processed from the second response method. The first request type and the second request type may be selected from one of a prefix request, suffix request, command request, resolution request, redirection request, search request, identifier registration request, commerce request, subscription request, navigation request, dialing request, messaging request, conferencing request, vendor request, service request, login request, status request, authorization request, and reference request.

The second request type is the identifier registration request when the first request type may be any request other than that of the identifier registration request. The first data request may have a resolution request and a first identifier, and include the locating of at least one network resource from the first identifier by determining whether the first identifier includes a domain name or valid IP address, generating the second data request from the selected response .type in response to determining that the first identifier does not include the domain name or the IP address, and processing the second data request in response to generating the second data request. The first identifier may also include a domain name that may be fictitious, valid, multilingual, resolvable, and/or available.

Locating the network resource from the first identifier may further include the steps of determining whether the domain name is fictitious, generating an accessible valid second identifier in response to determining that the domain name is fictitious, accessing the network resource corresponding to the second identifier in response to generating the second identifier, determining whether the domain name is valid in response to determining that the domain name is not fictitious, generating an accessible valid third identifier in response to determining that the domain name is not valid, accessing the network resource corresponding to the third identifier in response to generating the third identifier, determining whether the domain name is resolvable in response to determining that the domain name is valid, determining whether the first identifier is valid and accessible in response to determining that the domain name is resolvable, accessing the network resource corresponding to the first identifier in response to determining that the first identifier is valid and accessible, generating an accessible valid fourth identifier in response to determining that the first identifier is not valid or accessible, accessing the network resource corresponding to the fourth identifier in response to generating the fourth identifier, determining whether the valid domain name is available for registration in response to determining that the domain name is not resolvable, providing a registration interface in response to determining that the domain name is available for registration, and providing registrant information in response to determining that the domain name is not available for registration.

The first data request may also have a search request and at least one keyword or phrase. The search request may be processed with the Autosearch feature by selecting a search template, identifier generation template, and/or registration template. Processing the search request may further include the steps of determining whether the keyword or phrase is registered, locating at least one network resource corresponding to the keyword or phrase in response to determining that the keyword or phrase is registered, determining whether to register the keyword or phrase in response to determining that the keyword or phrase is not registered, processing the registration request in response to determining that the keyword or phrase is to be registered, determining whether the search request includes a prefix in response to determining that the keyword or phrase is not to be registered, processing the prefix request in response to determining that the search request includes the prefix, determining whether to generate at least one identifier other than that of a keyword to include with search results of the search request in response to determining that the first identifier does not include the prefix, generating at least one identifier other than that of a keyword from the first identifier in response to determining that at least one identifier other than that of a keyword is to be generated, determining status for each the generated identifier in response to generating the identifier, processing the search request having search results including access to the status in response to determining the status for each the generated identifier, and processing the search request having search results without providing the status in response to determining that at least one identifier other than that of a keyword is not to be generated.

In accordance with yet additional aspects of the present invention, an apparatus which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF THE DRAWINGS

FIG. 1l is a diagram depicting the location field or web page search request used in a conventional web browser.

FIG. 4a is a top level flowchart illustrating the step performed for processing a registration request in response to the determination of an unresolvable domain name in the preferred embodiment of the present invention.

FIG. 4b is a top level flowchart illustrating the step performed for providing an error message in response to the determination of an unresolvable domain name in the preferred embodiment of the present invention.

FIG. 4c is a flowchart illustrating the steps performed for generating a valid URI in response to determining that an existing valid URI is inaccessible in accordance with the present invention.

FIG. 5 is a diagram depicting an exemplary configuration settings interface in accordance with the present invention.

FIG. 8a is a flowchart illustrating the steps performed for generating identifiers and determining identifier availability in response decoding text from a broadcast in accordance with the present invention.

FIG. 8b is a flowchart illustrating the steps performed for generating identifiers and determining identifier availability in response converting speech to text in real time from an audio source in accordance with the present invention.

FIG. 8c is a flowchart illustrating the steps performed for generating identifiers and determining identifier availability in response to receiving the page source of a URI in accordance with the present invention.

FIG. 8d is a flowchart illustrating the steps performed for generating identifiers and determining identifier availability in response to receiving any request other than that of a registration request in accordance with the present invention.

FIG. 10c is a registration form depicting how a user may simultaneously register available identifiers across naming systems and select a subscriber profile in accordance with the present invention.

FIG. 10d is a sign-up form depicting how a user may save time at a later date by providing information in advance in accordance with the present invention.

DETAILED DESCRIPTION OF THE INVENTION

Figure 1A:
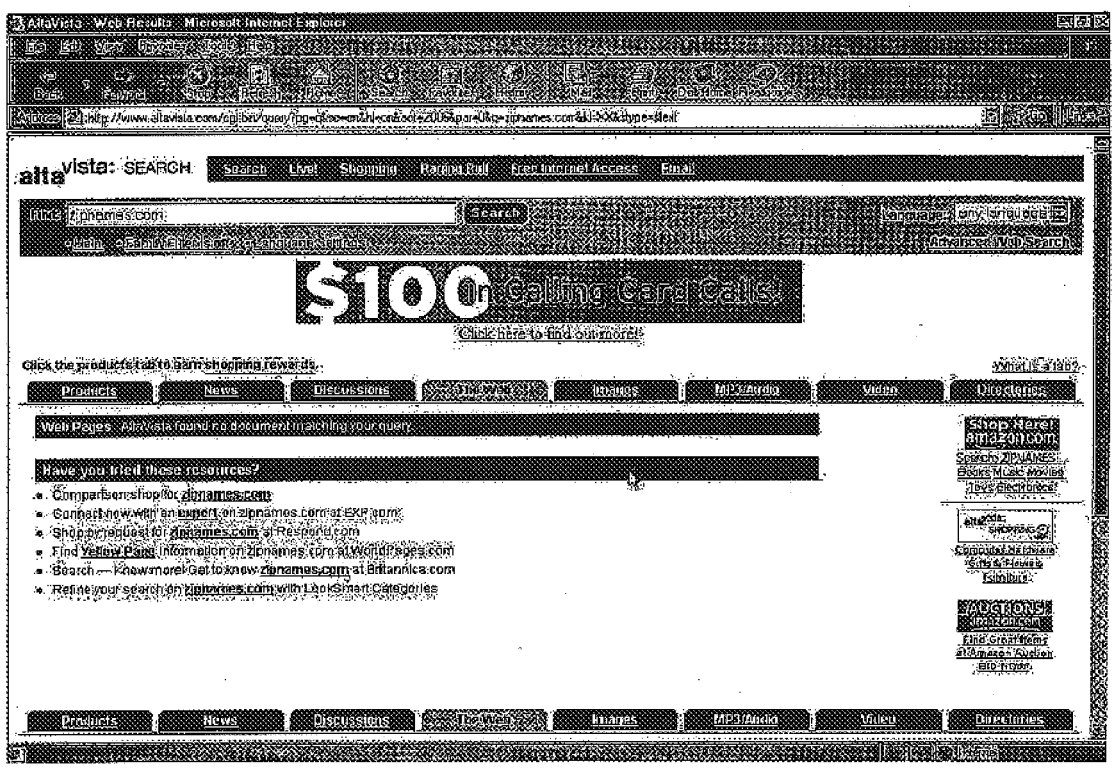
FIG. 1a illustrates an exemplary prior art web page after search results have been returned in response to entering a domain name into a search box.
Figure 1B:
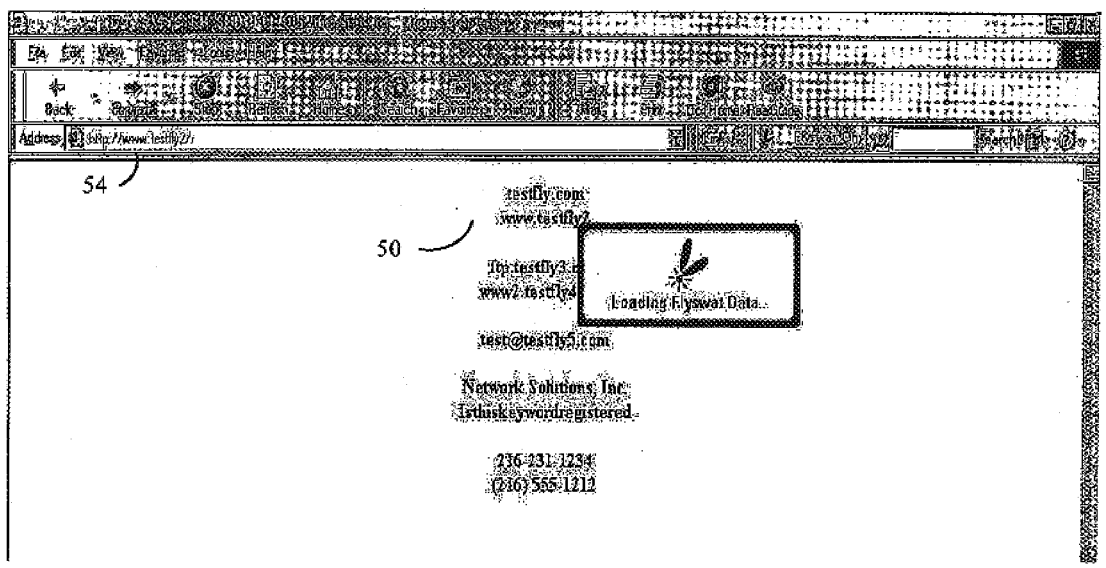
FIG. 1b illustrates an exemplary prior art popup box that unsuccessfully performs a resolution request in response to selecting a name having "www.".
Figure 1C:
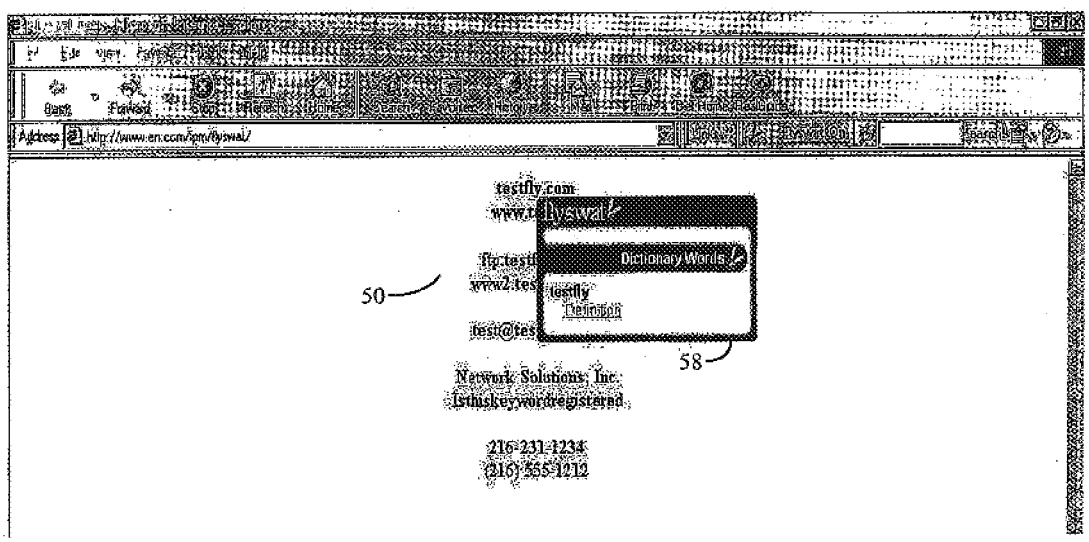
FIG. 1c illustrates an exemplary prior art popup box that displays a word definition in response to selecting a domain name.
Figure 1D:
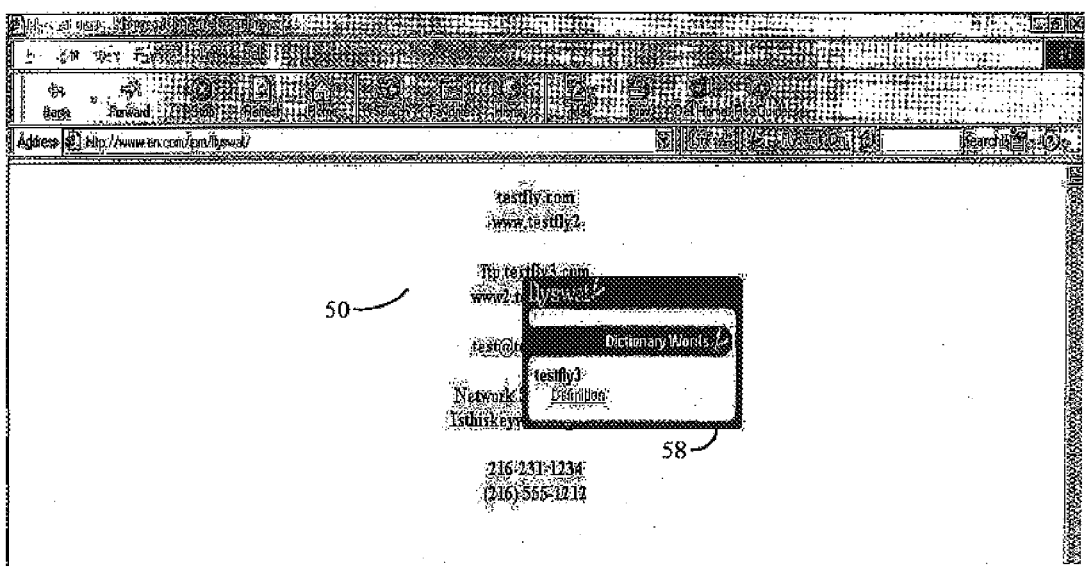
FIG. 1d illustrates an exemplary prior art popup box that displays a word definition in response to selecting a domain name having "ftp.".
Figure 1E:
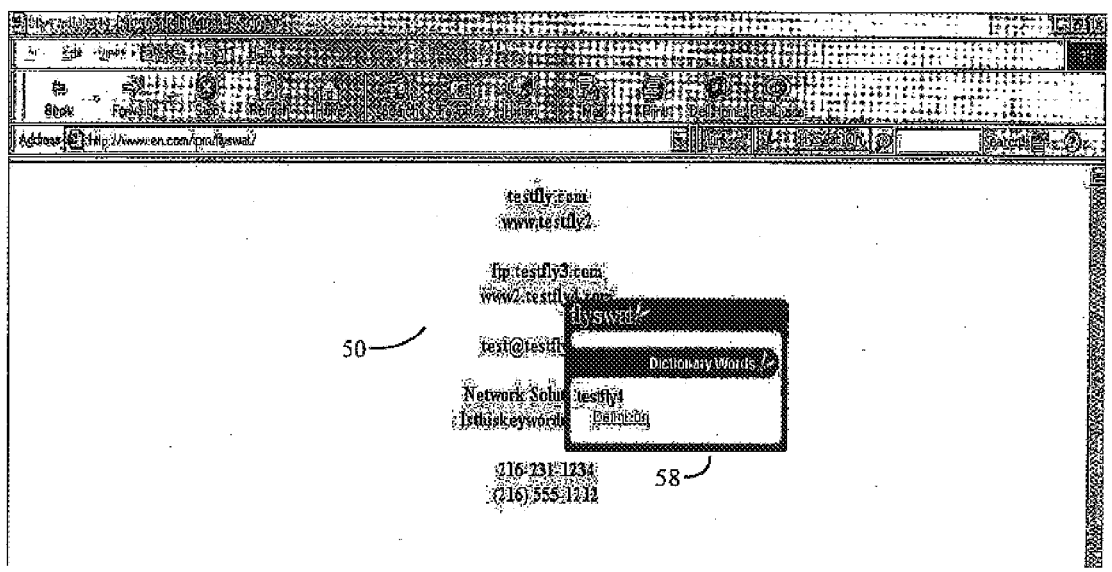
FIG. 1e illustrates an exemplary prior art popup box that displays a word definition in response to selecting a domain name having "www2.".
Figure 1F:
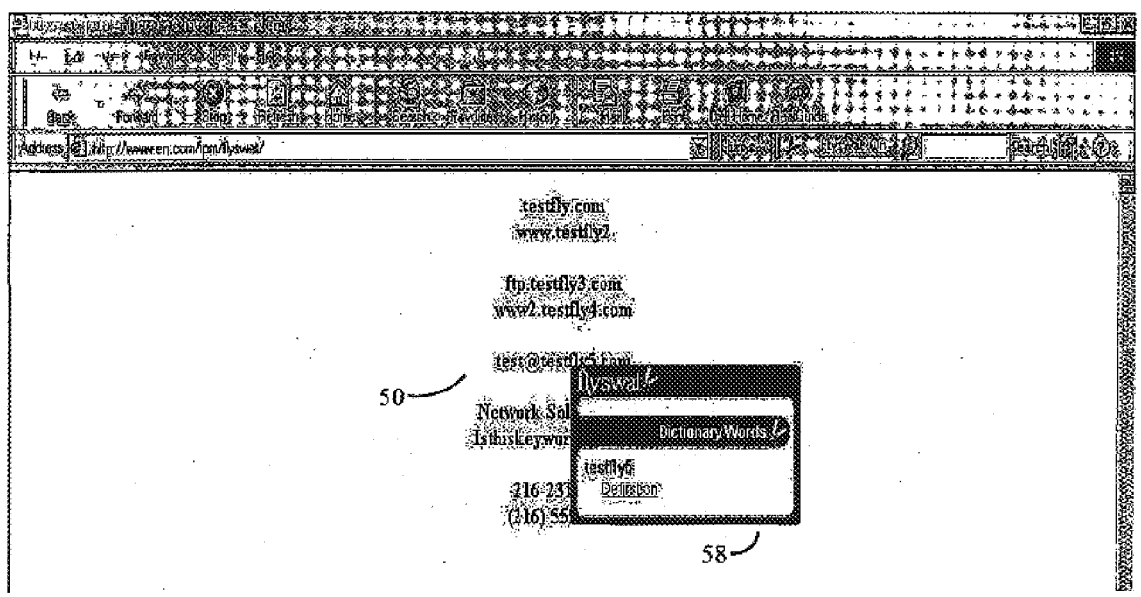
FIG. 1f illustrates an exemplary prior art popup box that displays a word definition in response to selecting an e-mail address.
Figure 1G:
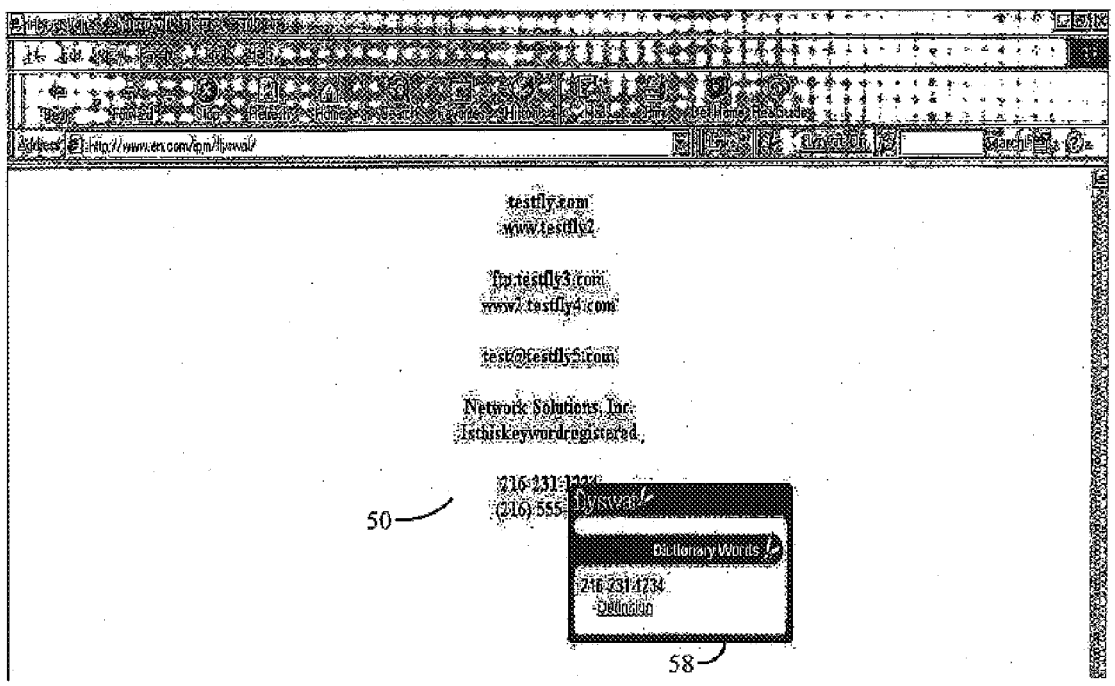
FIG. 1g illustrates an exemplary prior art popup box that displays a word definition in response to selecting a telephone number.
Figure 1H:
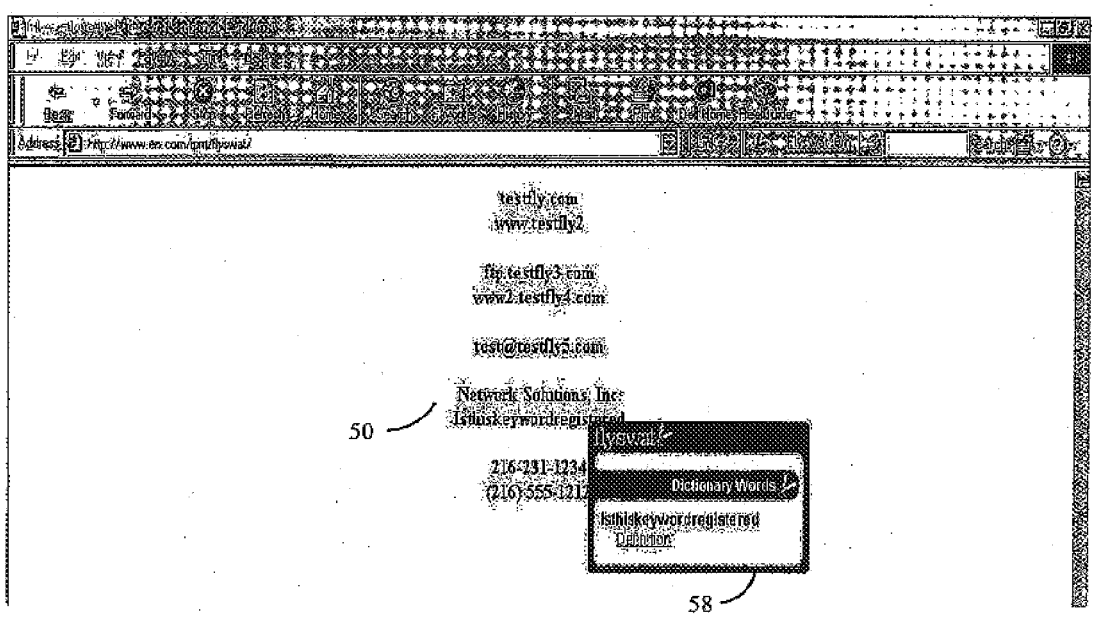
FIG. 1h illustrates an exemplary prior art popup box that displays a word definition in response to selecting a keyword.
Figure 1I:
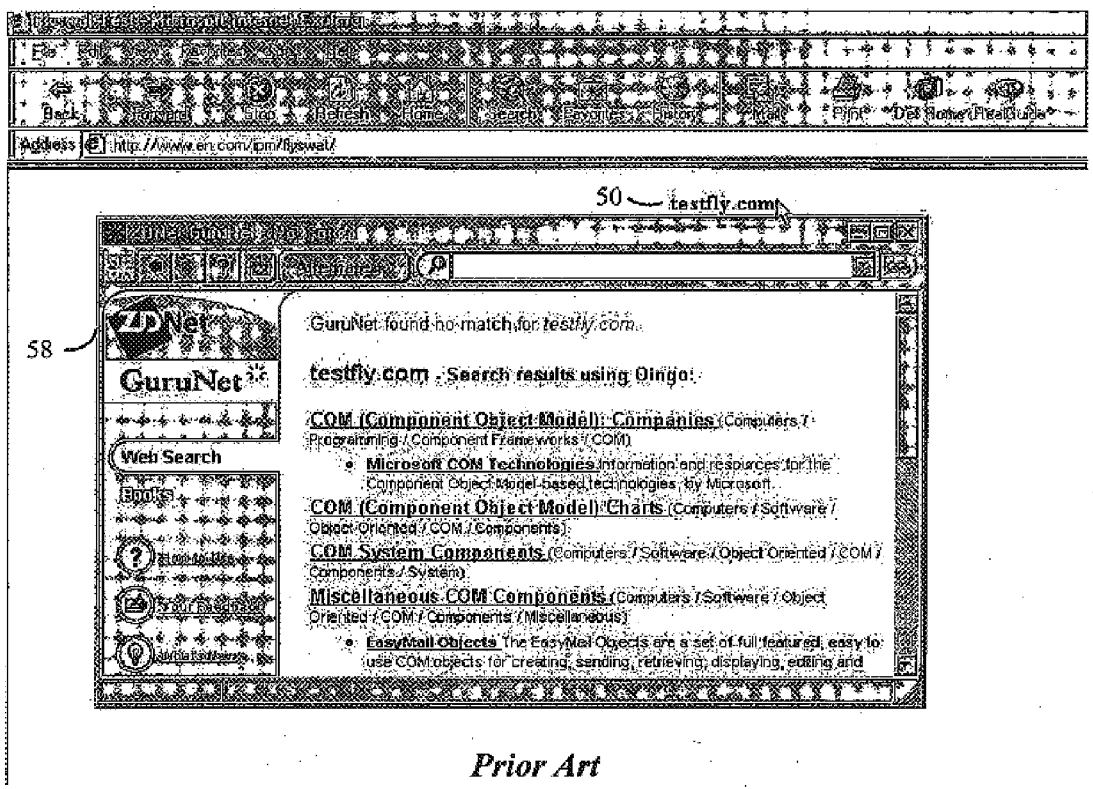
FIG. 1i illustrates an exemplary prior art popup box that displays search results in response to selecting a domain name.
Figure 1J:
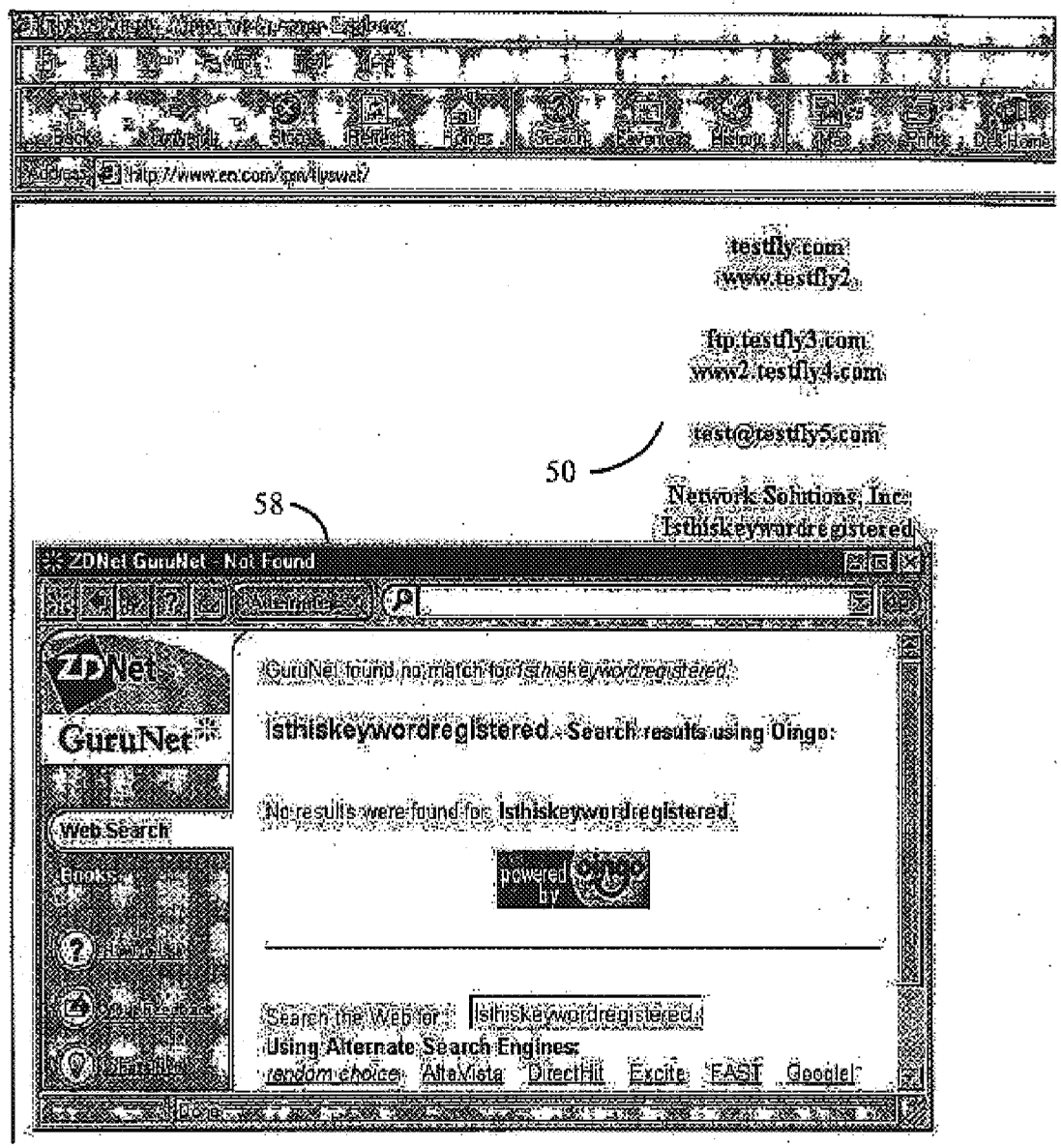
FIG. 1j illustrates an exemplary prior art popup box that displays search results in response to selecting a keyword.

The present invention will now be described with reference to the drawings, wherein like reference numerals are used to refer to like elements throughout.

Turning first to the nomenclature of the specification, the detailed description that follows represents processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Figure 1K:
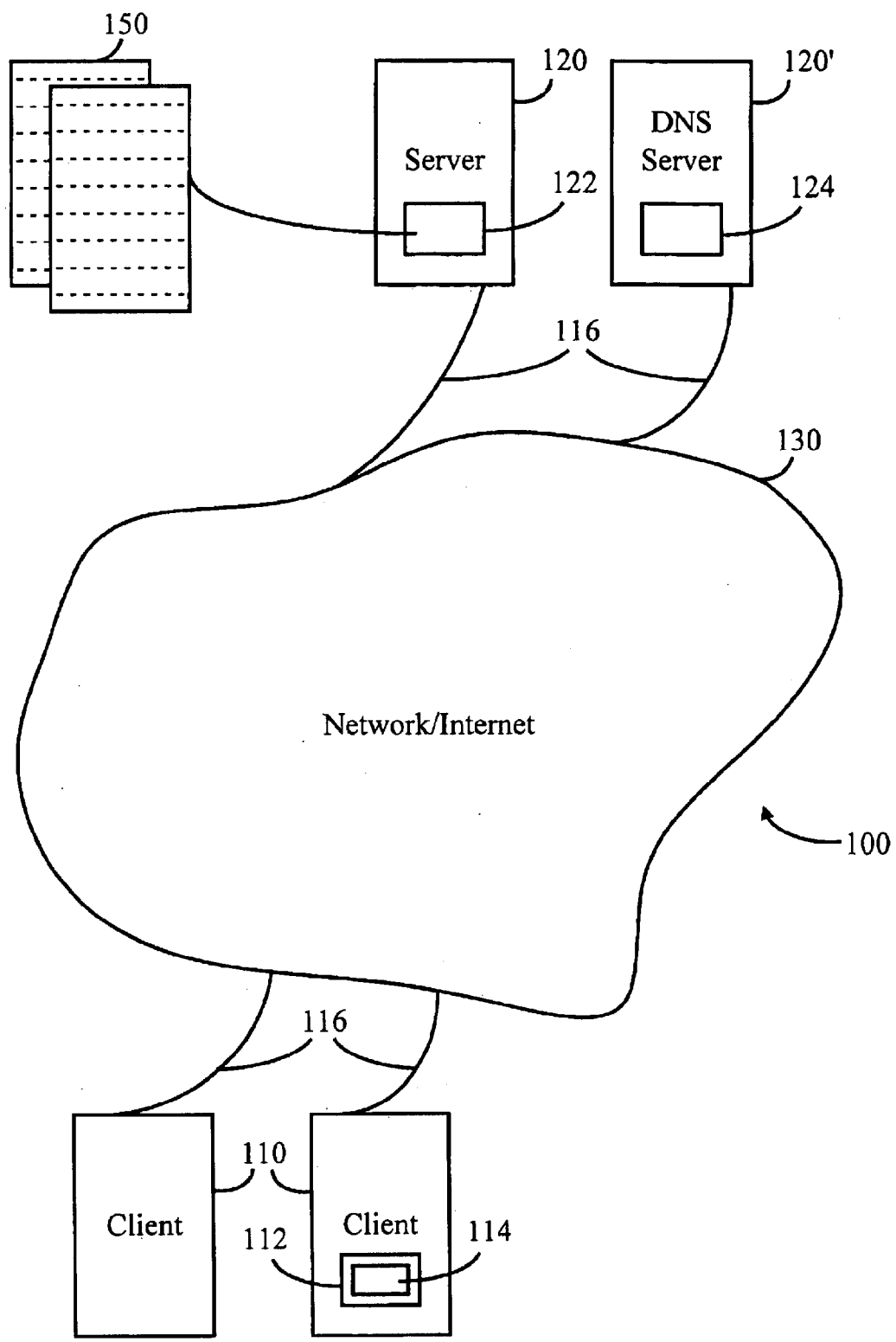
FIG. 1k is a block diagram of an exemplary distributed computer system in accordance with the present invention.
Figure 11:
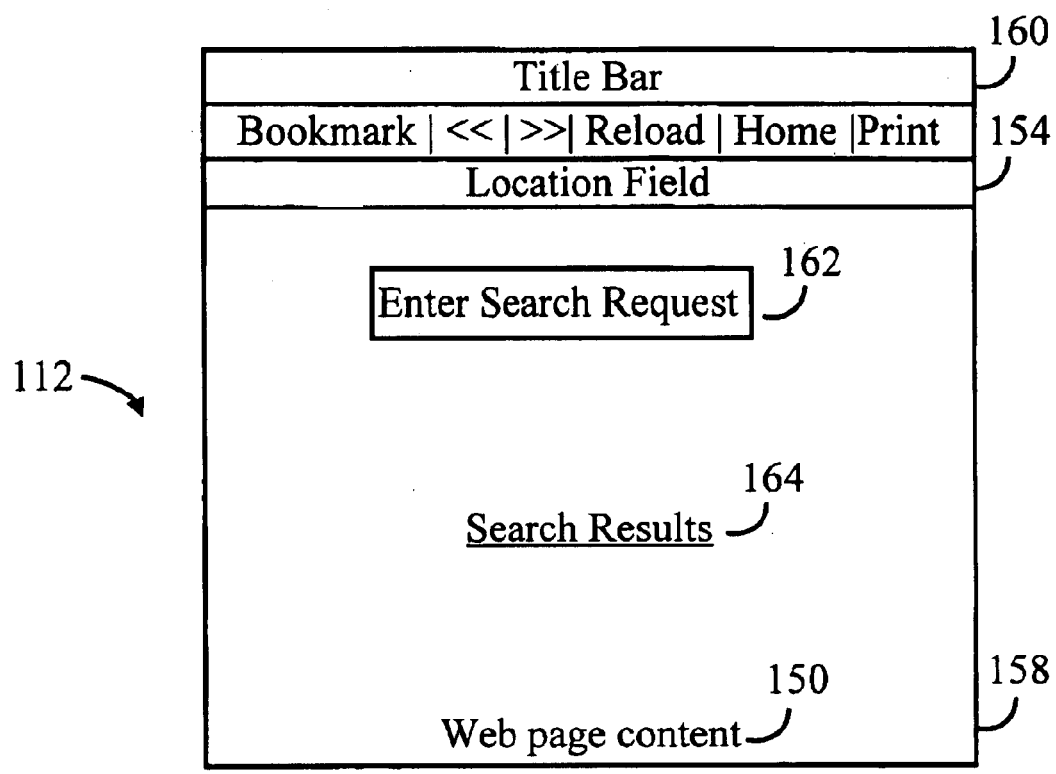

FIG. 1k illustrates an exemplary system for providing a distributed computer system 100 in accordance with one aspect of the present invention and includes client computers or any network access apparatus 110 connected to server computers 120 via a network 130. The network 130 may use Internet communications protocols (IP) to allow the clients 110 to communicate with the servers 120. The communication device of a network access apparatus 110 may include a transceiver, a modem, a network interface card, or other interface devices to communicate with the electronic network 130. The network access apparatus 110 may be operationally coupled to and/or include a Global Positioning System (GPS). The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may provide an on-line service, an Internet service provider, a local area network service, a wide area network service, a cable television service, a wireless data service, an intranet, a satellite service, or the like.

The client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, a network television, an internet television, a set top box, a web-enabled telephone, an internet appliance, a portable wireless device, a television receiver, a game player, a video recorder, and/or an audio component, for example.

Each client 110 typically includes one or more processors 166, memories 168, and input/output devices 170. An input device may be any suitable device for the user to give input to client computer 110; for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they could be combined; for example: a display with an integrated touchscreen, a display with an integrated keyboard, or a speech-recognition unit combined with a text-to-speech converter.

The servers 120 can be similarly configured. However, in many instances server sites 120 include many computers, perhaps connected by a separate private network. In fact, the network 130 may include hundreds of thousands of individual networks of computers. One aspect of the present invention includes a specific type of server system 120 called a DNS server system 120' which stores in memory a DNS database 124 having DNS records that translate domain names into IP addresses and vice versa. The DNS server system 120' is connected 116 to a network 130. The DNS is a distributed database (of mappings) 124 implemented in a hierarchy of DNS servers (name servers) 120' and an application-layer protocol that allows hosts and name servers to communicate in order to provide the translation service. Name servers 120' are usually UNIX machines running BIND software. In order to deal with an issue of scale of the Internet, the DNS uses a large number of name servers 120', organized in a hierarchical fashion and distributed around the world. No single name server 120' has all of the mappings 124 for all of the hosts in the Internet. Instead, the mappings 124 are distributed across many name servers 120'.

Although the client computers 110 are shown separate from the server computers 120, it should be understood that a single computer may perform the client and server roles. Those skilled in the art will appreciate that the computer environment 100 shown in FIG. 1k is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional input/output devices. Those skilled in the art will appreciate that the present invention may also be practiced with Intranets and more generally in distributed environments in which a client computer requests resources from a server computer.

During operation of the distributed system 100, users of the clients 110 may desire to access information records 122 stored by the servers 120 while utilizing, for example, the Web. Furthermore, such server systems 120 may also include one or more search engines having one or more databases 124. The records of information 122 can be in the form of Web pages 150. The pages 150 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 150. The browser programs 112 enable users to enter addresses of specific Web pages 150 to be retrieved. Typically, the address of a Web page is specified as a Uniform Resource Identifier (URI) or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

A client of the DNS is called a resolver 114. Resolvers 114 are typically located in the application layer of the networking software of each TCP/IP capable machine. Users typically do not interact directly with the resolver 114. Resolvers 114 query the DNS by directing queries at name servers, which contain parts of the distributed database that is accessed by using the DNS protocols to translate domain names into IP addresses needed for transmission of information across the network. DNS is commonly employed by other application-layer protocols—including HTTP, SMTP and FTP—to translate user-supplied domain names to IP addresses. When a browser program 112 (e.g., an HTTP client), running on a user's machine, requests a URL having a resolvable domain name, in order for the user's machine to be able to send an HTTP request message to a server 120, the user's machine must obtain the IP address of the domain name. The user machine then runs the resolver 114 (DNS client) on the client-side of the DNS application. The browser 112 extracts the domain name from the URL and passes the domain name to the resolver 114 on the client-side of the DNS application. As part of a DNS query message, the DNS client 114 sends the domain name to a DNS server system 120' connected to the Internet. The DNS client 114 eventually receives a reply, which includes the IP address for the domain name. The browser then opens a TCP connection 116 to the HTTP server process 120 located at the IP address.

FIG. 1l more specifically illustrates an exemplary selection of common operative components of a web browser program 112. The web browser 112 enables a user to access a particular web page 150 by typing the URL for the web page 150 in the location field 154. The web page 150 contents corresponding to the URL from the location field 154 may be displayed within the client area of the web browser display window 158, for example. Title information from the web page 150 may be displayed in the title bar 160 of the web browser 112. The web page 150 contents may further include a user interface element such as that of an input text box 162 for inputting search requests and, in turn, search results having identifiers 164 such as a hyperlink or URL.

Figure 1M:
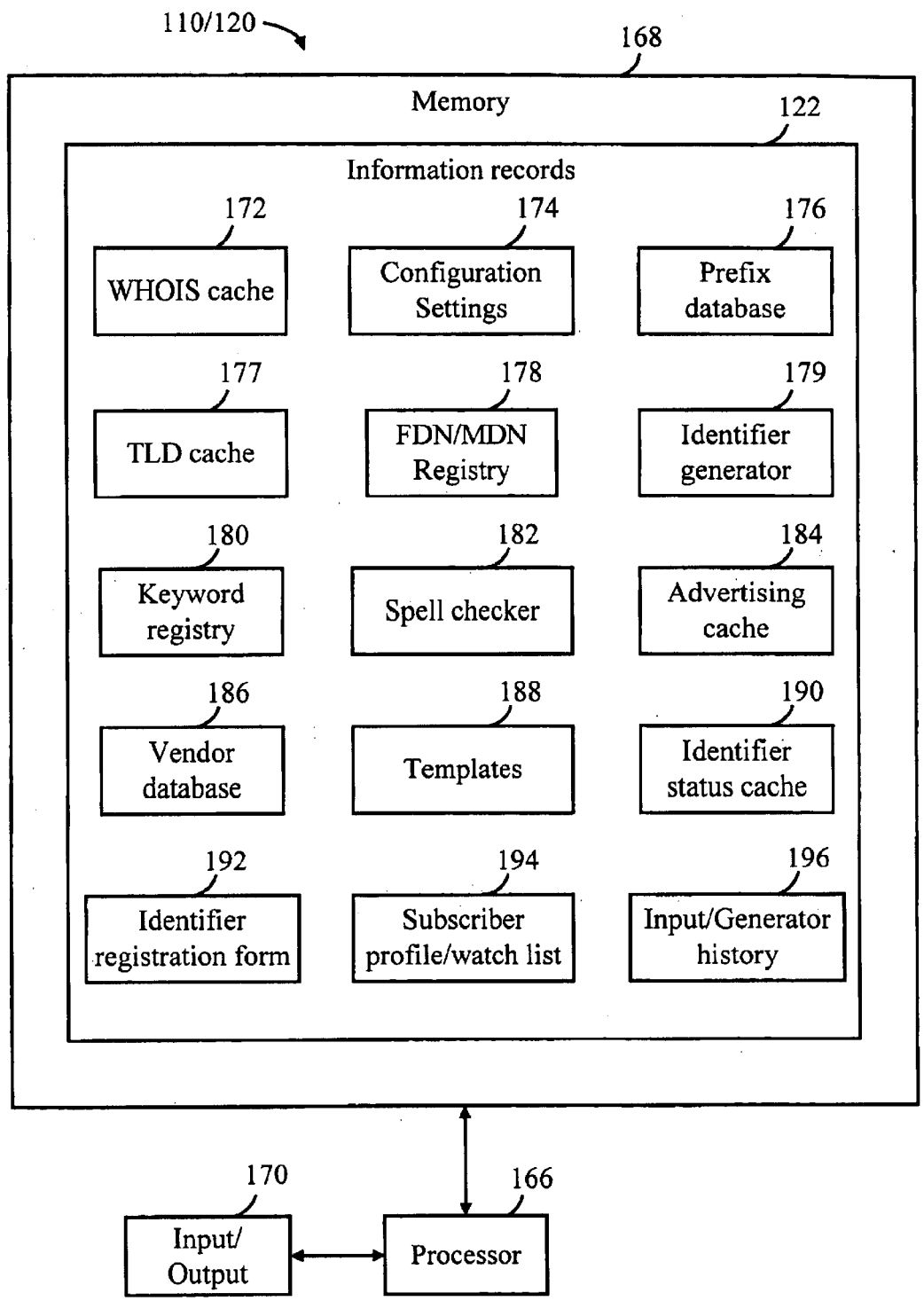
FIG. 1m is a block diagram illustrating exemplary information records and/or programs stored in memory in accordance with the present invention.

FIG. 1m illustrates a block diagram of a storage device such as memory 168 in operative association with a processor 166. The processor 166 is operatively coupled to input/output devices 170 in a client 110 and/or server 120 computing system. Stored in memory 168 may be programs, scripts, and information records 122 having any combination of exemplary content such as lists, files, and databases. Such records may include for example: WHOIS cache system 172, configuration settings 174, prefix database 176, TLD cache 177, FDN/MDN registry 178, identifier generator 179, keyword/phrase registry 180, spell checker 182, advertising cache 184, vendor database 186, templates 188, identifier status cache system 190, uniform/universal identifier registration form 192, subscriber profile/watch list 194, and input/generator history 196. These information records 122 are further introduced and may be discussed in more detail throughout the disclosure of this invention.

Figure 2A:
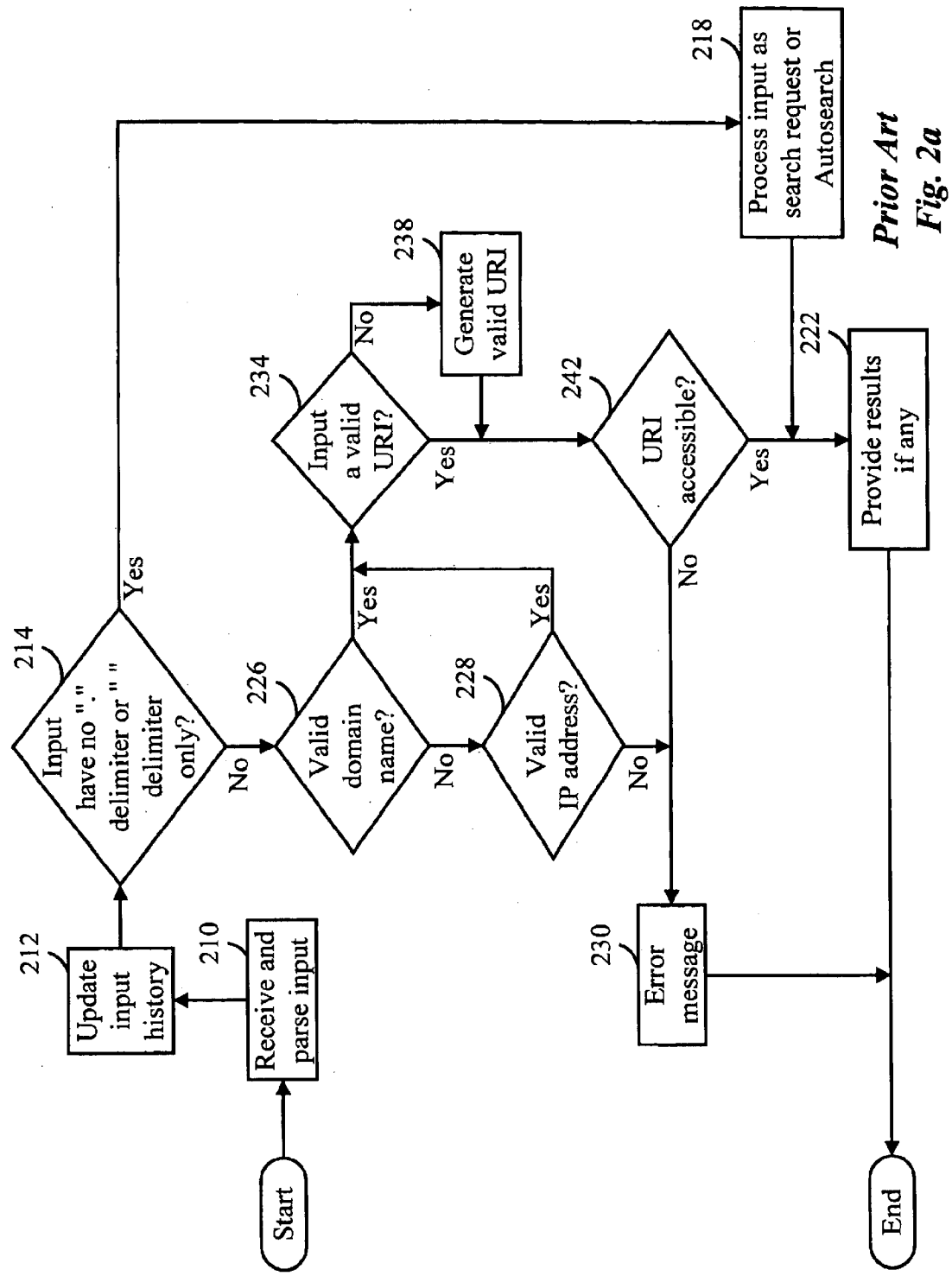
FIG. 2a is a top level flowchart illustrating the steps of an exemplary prior art system for processing a data request upon receiving an identifier and a resolution request type.

FIG. 2a is a top level flowchart illustrating the steps of an exemplary prior art system for processing a data request upon receiving an identifier and a resolution request type. A device such as a network access apparatus 110, servlet, applet, stand-alone executable program, or user interface element such as a text box object, command line, speech to text interface, location field 154 of a web browser 112, may receive and parse input such as text or voice in step 210 and input history 196 is updated in step 212. Tests are then performed to determine how to process the received input 210. For instance, when it is determined in step 214 that input 210 has no "." delimiters or " "delimiters only, it becomes clear that there is no domain name or IP address present and the input 210 may be processed as a search request (e.g., AutoSearch feature) in step 218. Results, if any, are then notified, accessed, and/or displayed in step 222. When the presence of the "." delimiter is determined in step 214, the input may include either an IP address or a domain name. When a domain name is parsed, the validity of the domain name is determined in step 226. Validity of URI syntax is explained in T. Berners-Lee, "Informational RFC (Request for Comment) 1630: Universal Resource Identifiers in WWW—A Unifying Syntax for the Expression of Names and Addresses of Objects on the Network as used in the World-Wide Web", Internet Engineering Task Force (IETF), June 1994, "http://www.faqs.org/rfcs/rfc1630.html", which is herein incorporated by reference.

If the parsed domain name is determined in step 226 to be not valid, a browser error message may be displayed in step 230. In turn, when an IP address is parsed, the validity of the IP address may be determined in step 228. If the IP address is determined in step 228 to be not valid, an error message may be displayed in step 230. When a domain name is determined valid in step 226 or an IP address is determined valid in step 228, it may then be further determined in step 234 whether input 210 may include a valid URI. If there is no valid URI, then a valid URI may be generated in step 238 from input 210. For instance, if a scheme is missing, the web browser may add the prefix "http://" to the text or another scheme prefix. After performing input validity tests, the steps of domain name resolvability may be performed. When a received 234 or generated 238 valid URI is determined accessible in step 242, then results, if any, may then be either notified, accessed, and/or displayed (provided) in step 222. However, when a valid URI is determined not accessible in step 242, an error message may be displayed in step 230. In other browser configurations the inaccessible URI may be processed as a search request in an attempt to yield results other than that of an error message in step 230.

One example of such a prior art system is when a domain name (e.g., "example.com") is entered into a location field 154 of a web browser program such as MSIE. The MSIE browser generates a URI (e.g., "http://www.example.com") from the domain name. If the domain name is resolvable (e.g., the domain name is successfully translated into its corresponding IP address as discussed in FIG. 2b) then the web browser attempts to access content from a web server corresponding to the URI. If the domain name is not resolvable, then the input 210 may be passed and the following URI is generated:

"http://auto.search.msn.com/response.asp?MT=example.com&srch=3&prov=&utf8"

The "." is one delimiter of the DNS system whereas the " " is one delimiter of plain text language. When a keyword search is provided as input, (e.g., "search example") it may be determined that DNS name resolution is unnecessary and the input 210 may be immediately redirected to the Microsoft Network (MSN) AutoSearch feature. In effect, all input that can not be successfully resolved/accessed may be redirected to the server at "auto.search.msn.com" and may be redirected accordingly as either an error message or search request. The Netscape Navigator browser program does not provide additional processing when a domain name is not resolvable, and instead, displays the following error message: "Browser is unable to locate the server: example.com The server does not have a DNS entry. Check the server name in the Location (URL) and try again."

Figure 2B:
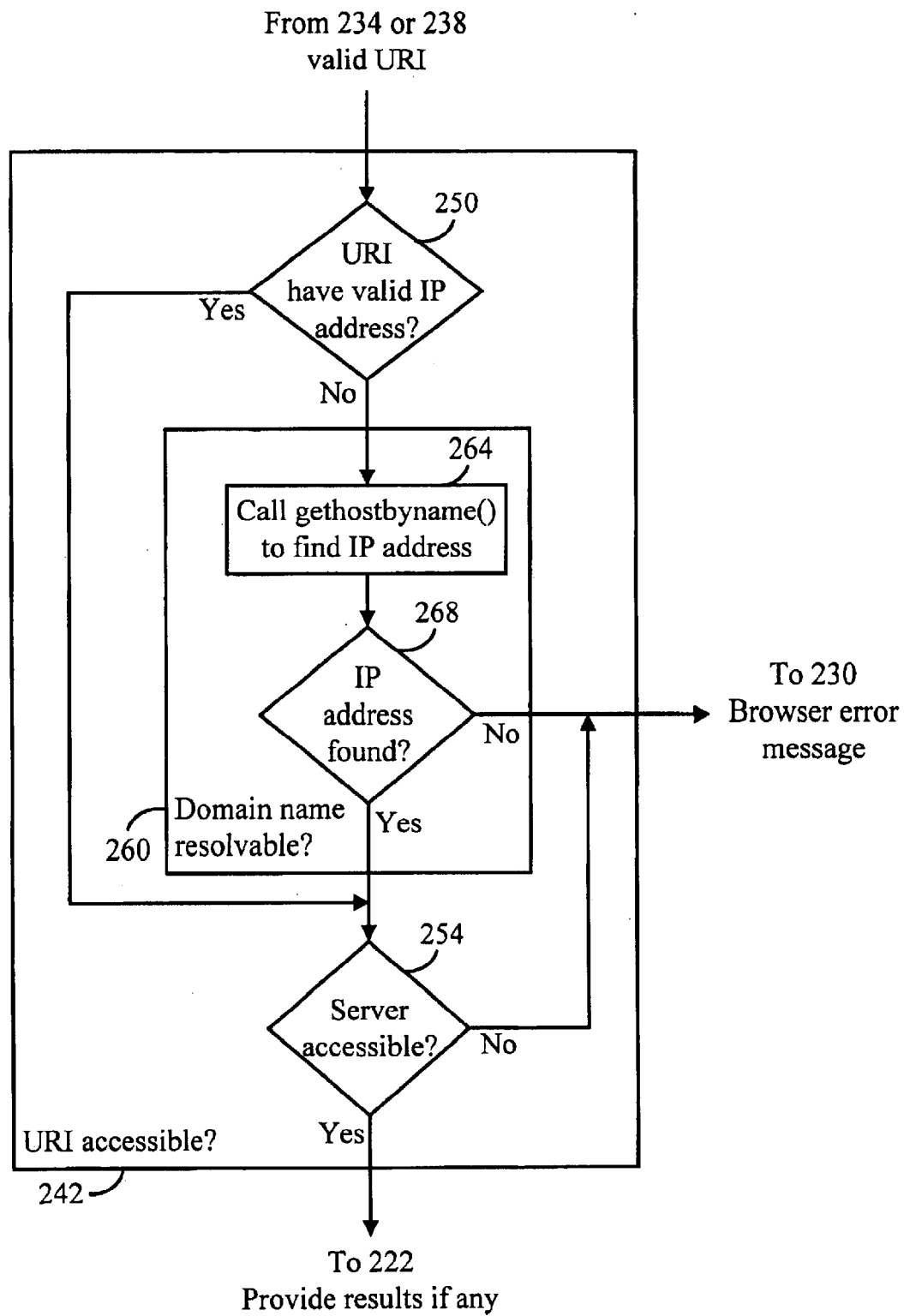
FIG. 2b is a flowchart illustrating the steps performed by a prior art system for determining URI resolvability.

FIG. 2b more specifically illustrates steps that are performed for determining URI accessibility (step 242). If the URI is determined in step 250 to include a valid IP address, then a request may be submitted to access the server located at the IP address. When the server is found in step 254 and accessed, results, if any, may then be notified, accessed, and/or displayed in step 222. However, if the server is not found in step 254, an error message is displayed in step 230. When the URI includes a valid domain name, then the resolvability of the domain name may be determined in step 260. Domain name resolution is explained in P. Mockapetris, "Informational RFC (Request for Comment) 1035: Domain Names—Implementation and Specification", Internet Engineering Task Force (IETF), November 1987, "http://www.faqs.org/rfcs/rfc1035.html", which is herein incorporated by reference.

Specific steps for the determination of domain name resolvability (step 260) may include issuing a function call in step 264 from the web browser 112 to gethostbyname( ) from the resolver library 114 to translate the domain name into its corresponding IP address from the DNS database 124 of a DNS server system 120'. When gethostbyname( ) returns a NULL pointer in step 264, then it may be determined in step 268 that no IP address is found and a browser error message is displayed in step 230. However, when an IP address is found in step 268, then a request is submitted to access the server located at the IP address. When the server is found in step 254 and accessed, results, if any, may then be notified, accessed, and/or displayed in step 222. However, if the server is not found in step 254, an error message may be displayed in step 230. As discussed earlier, in other browser configurations the inaccessible URI may be processed as a search request in an attempt to yield results other than that of an error message in step 230.

When a domain name is received as input to a registration service, the availability of the domain name may be determined. If the domain name is not available, registrant information is returned and the client is notified that the domain name in question is not available and may provide the option of checking the availability of other domain names. When a domain name is available, a user may be presented with the choice of registering the domain name. Upon completion of registration, another domain name may then be checked for availability.

Figure 2C:
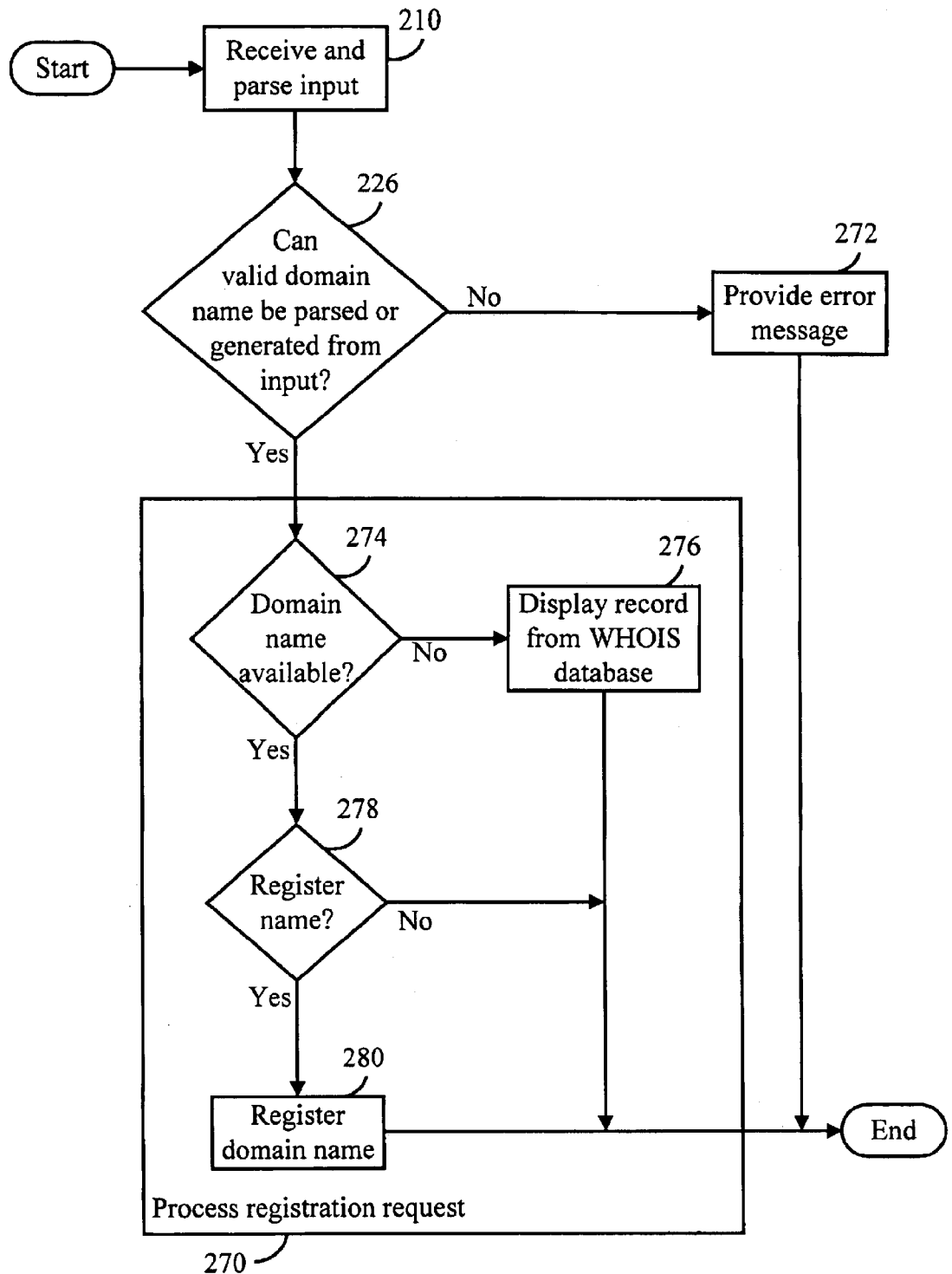
FIG. 2c is a flowchart illustrating the steps performed by a prior art system for processing a domain name registration request.

FIG. 2c illustrates how a registration service may process a registration request. A device such as a network access apparatus 110, servlet, applet, stand-alone executable program, or a user interface element such as a text box object, receives and parses input in step 210. It is determined in step 226 whether a valid domain name may be parsed or generated from input. When input can not be processed as a registration request then an error message may be provided in step 272 otherwise a registration request may be processed in step 270 for each valid domain name. To process such a request, availability of the domain name may be determined in step 274. If the domain name is determined to be not available in step 274, then (registrant information) a record from a corresponding WHOIS database may be retrieved and displayed in step 276.

Because WHOIS requests are so heavily relied on, methods for minimizing network bandwidth of these services may be considered preferable. For instance, a browser 112 may be configured to first access a client WHOIS cache 172 and/or a series of distributed WHOIS caches 172 to increase lookup performance. Such caches may be distributed in a manner similar to the DNS wherein each WHOIS cache 172 may make further hierarchical reference to the next successive WHOIS cache 172 until a definitive result has been found. When the domain name is determined available in step 274, then such information may be displayed accordingly (via a registration interface), prompting the client to register the domain name. When it is determined in step 278 that the client may wish to register the domain name, further information may be displayed to assist the user in registering the domain name in step 280.

Figure 3A:
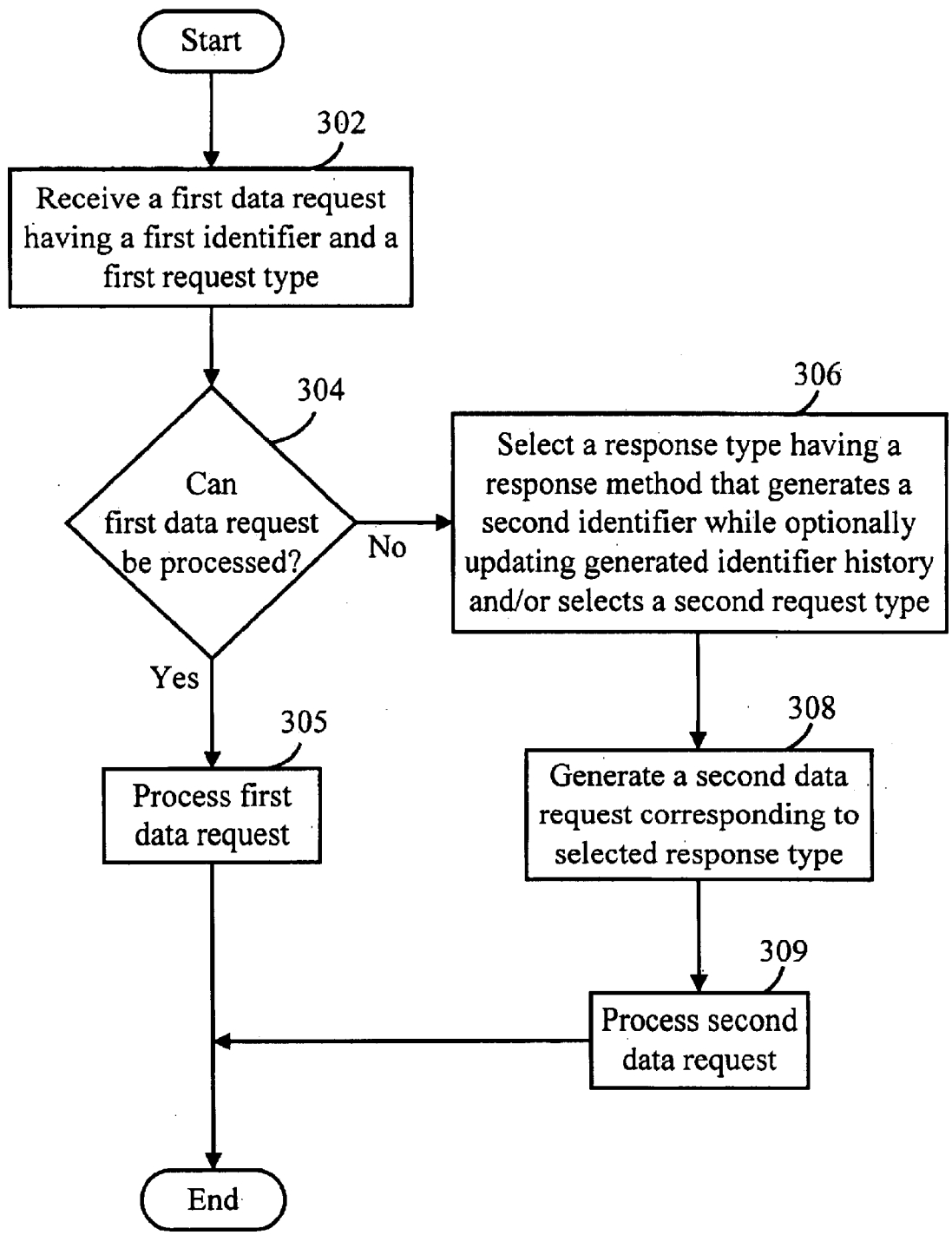
FIG. 3a is a top-level flowchart illustrating the steps performed for processing a data request having an identifier and request type in a preferred embodiment of the present invention.

FIG. 3*a* is a top-level flowchart illustrating the steps performed for processing a data request having an identifier and request type. A data request may include at least one identifier and at least one request type (e.g., identifier is a URI and request type is a resolution request, identifier is a keyword and request type is a search request, identifier is a domain name and request type is a registration request, etc.). When a first data request having a first identifier and a first request type is received in step 302, it may be determined whether the first data request can be processed in step 304. The first data request may be processed in step 305 upon determining that the first data request can be processed in step 304. The correspondence between identifiers and request types may be one-to-one, one-to-many, many-to-one, or many-to-many relationship.

When the first data request can not be processed, a response type having a response method may be selected in step 306 that may generate a second identifier and/or select a second request type. Whenever an identifier is generated, an identifier generator history database 196 may be updated. A second request type may correspond to the first identifier and the second identifier may correspond to the first request type. Request types may include one of a prefix request, suffix request, command request, resolution request, redirection request, search request, identifier registration request, commerce request, subscription request, navigation request, dialing request, messaging request, conferencing request, vendor request, service request, login request, status request, authorization request, and reference request.

When a response type is selected, a second data request corresponding to the selected response type may be generated in step 308. The second data request may then be processed in step 309. A response type may employ a plurality of response methods to access multiple network resources corresponding to any generated and/or selected identifiers and/or request types. Steps for accessing multiple network resources in response to receiving an identifier is explained in U.S. patent application Ser. No. 09/532,500 filed Mar. 21, 2000, by Schneider, entitled "Fictitious domain name method, product, and apparatus", which is herein incorporated by reference.

Figure 3B:
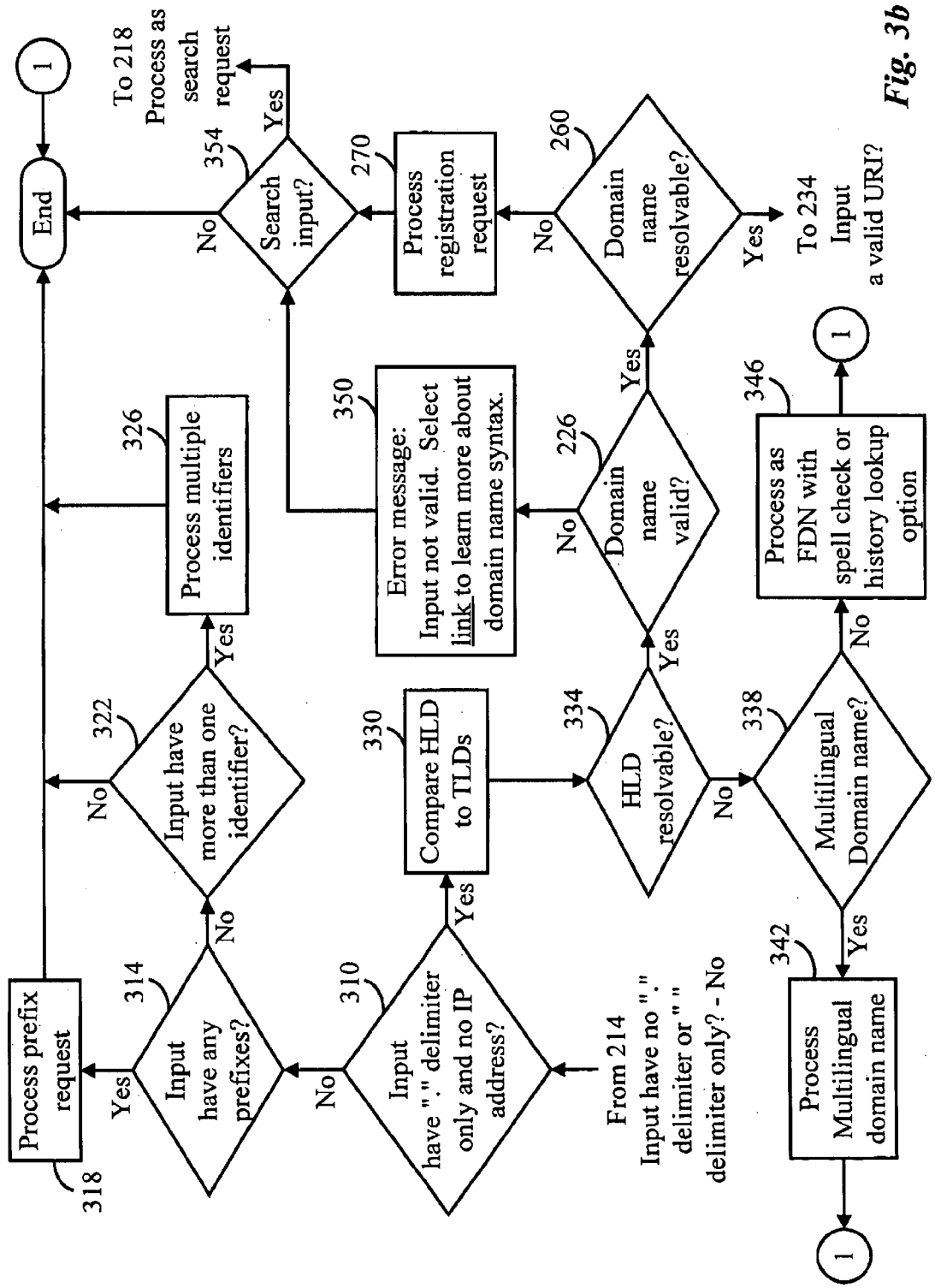
FIG. 3b is a top-level flowchart illustrating the steps performed for integrating resolution services, search services, and registration services in accordance with the present invention.

FIG. 3*b* is a toplevel flowchart illustrating the steps performed for integrating a multitude of services in response to receiving valid and/or fictitious identifiers. When it is determined in step 214 that input 210 does not include no delimiters or " " delimiters only then it may be further determined in step 310 whether input includes "." delimiters only and no IP address. If not, then it may be determined in step 314 whether input 210 includes any prefixes. When a prefix is detected while consulting a prefix database 176, then a prefix request may be processed in step 318. When it is determined in step 314 that there are no prefixes then it may be determined in step 322 whether input 210 includes more than one identifier. If so, then the plurality of identifiers may be processed in step 326.

A domain name may be considered an object having many properties or attributes, methods, and events. For instance, a domain name may be bought, sold, leased, escrowed, transferred, edited, auctioned, listed, locked, trademarked, dialed, e-mailed, registered, and resolved or the like. A domain name may be considered a global network identifier and such properties/attributes and/or methods may be considered a request type (e.g., prefix request). All such attributes may be used as prefixes for determining how a domain name is processed during any request type. Steps for processing prefixes and/or a plurality of identifiers is explained in U.S. patent application Ser. No. 09/598,134 filed Jun. 21, 2000, by Schneider, entitled "Method and apparatus for integrating resolution services, registration services, and search services", which is herein incorporated by reference. Prefixes may include functions such as edit, handle, list, status, history, watch, renew, transfer, escrow, consolidate, auction, bid, value, buy, sell, lease, generate, whois, expire, registrar, tools, redirect, lock, email, webhost, incorporate, trademark, geo, and/or dial.

When it is determined in step 310 that input 210 includes "." delimiters only and no IP address then the HLD is compared in step 330 to a list of resolvable TLDs or TLD cache 177 to determine HLD resolvability in step 334. When the HLD is determined in step 334 to be not resolvable, then the HLD is a TLDA, and it may be further determined in step 338 whether the input 210 includes any multilingual domain names (MDNs) by consulting a FDN/MDN registry 178. If so, then input 210 may be processed in step 342 as a MDN. Whenever a TLDA is detected, the domain name is determined fictitious and the step of consulting a MDN/FDN registry 178, spell checker 182, and/or input/generator history 196 may be employed to assist with identifier generation/selection and data request processing in general. The processing of multilingual domain names is explained, for example, when accessing the i-DNS.net International, Inc. web site from the URL:

http://www.i-dns.net/resources/tp/TP000350-01.html"

Teachings from such standards and protocols may be readily applied in accordance with the present invention by those skilled in the art. When no multilingual domain name is detected, then input 210 is further processed in step 346 as a FDN with the option of employing spell check 182 or input/generator history 196 lookup. Steps for processing a FDN is explained in U.S. patent application Ser. No. 09/532,500 filed Mar. 21, 2000, by Schneider, entitled "Fictitious domain name method, product, and apparatus", which is herein incorporated by reference. A TLDA is a specific form of aliasing that is subsidiary to the broader process of Domain Aliasing (DA). Whenever a TLDA is detected, all other parsed domains and subdomains may also possibly be aliases. Each domain or subdomain may be considered a data element or component data that may function as an alias whenever a TLDA is detected. A FDN Registry 178 or translation databases may be used to register and process other forms of domain aliasing in addition to TLDA processing.

If the HLD is determined in step 334 to be resolvable, then it may be determined in step 226 whether the domain name is valid. When it is determined in step 226 that the detected domain name is not valid then a specific error message is displayed in step 350 stating "Domain name is not valid. Select link to learn more about proper domain name syntax". However, when it is determined in step 226 that the detected domain name is valid, then it may be determined in step 260 whether the domain name is resolvable (see FIG. 2b). When the detected valid domain name is resolvable, it may then be further determined in step 234 whether input 210 includes a valid URI, etc.

However, when the detected domain name is determined in step 260 to be not resolvable, then the domain name may be processed in step 362 as a registration request. Domain name resolution is explained in P. Mockapetris, "Informational RFC (Request for Comment) 1035: Domain Names—Implementation and Specification", Internet Engineering Task Force (IETF), November 1987, "http://www.faqs.org/rfcs/rfc1035.html", which is herein incorporated by reference. Domain name availability is determined as part of processing a registration request in step 270. Upon display of a domain name syntax error or after processing a registration request it may be further determined in step 354 whether received input 210 is processed as a search request in step 218.

A WHOIS request is performed to determine domain name availability. When a domain name is already registered (e.g., determined not available), registrant information may be provided to the client system. However, when the domain name is available, a registration form may be processed and submitted to a registrar and/or registry and to its partners and/or affiliates. Specification of the WHOIS protocol is provided in K. Harrenstien, M. Stahl, and E. Feinler, "Informational RFC (Request for Comment) 954: NICNAME/WHOIS", Internet Engineering Task Force (IETF), October 1985, "http://www.faqs.org/rfcs/rfc954.html", which is herein incorporated by reference.

Figure 3C:
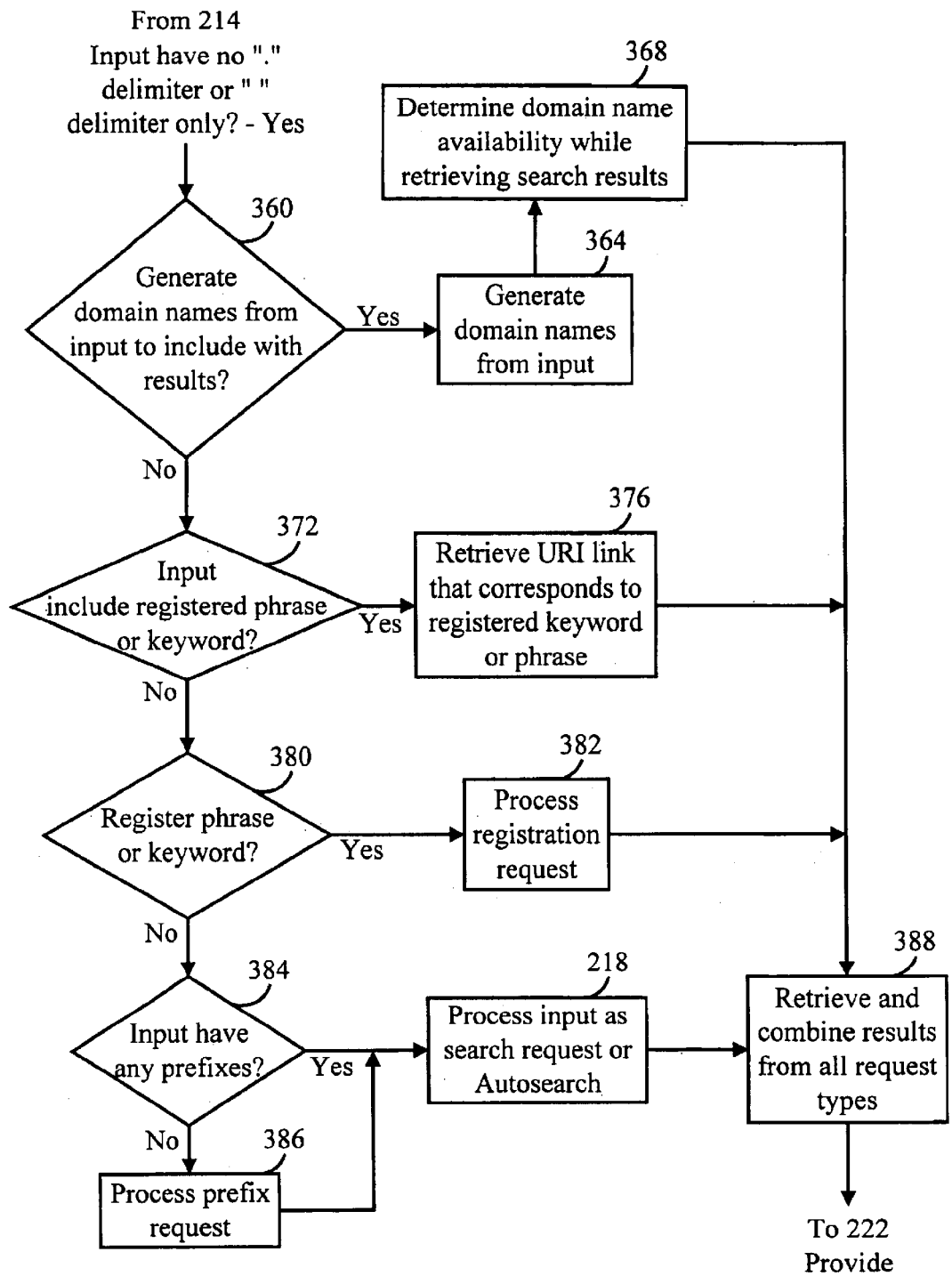
FIG. 3c is a flowchart illustrating the steps performed for integrating domain name availability and registration services for a given search request in accordance with the present invention.

FIG. 3c is a flowchart illustrating the steps performed for integrating domain name generation services with search services. When it is determined in step 214 that input 210 includes no "." delimiters or " " delimiters only then it may be further determined in step 360 whether to generate domain names from input 210 while processing a search request. Steps for generating domain names (including concatenating a TLD to generated word combinations including prefixes and suffixes from a plurality of search terms/keywords) and determining their availability for registration in response to receiving a search request are explained in U.S. Provisional Application Ser. No. 60/160,125 filed Oct. 18, 1999, by Schneider, entitled "Method and system for integrating resource location, search services, and registration services" and U.S. patent application Ser. No. 09/598,134 filed Jun. 21, 2000, by Schneider, entitled "Method and apparatus for integrating resolution services, registration services, and search services", which are herein incorporated by reference.

When domain name generation is enabled in step 360, domain names are generated in step 364 from input and domain name availability may be determined in step 368 for each generated domain name while retrieving search results, otherwise it may be determined in step 372 whether input 210 includes a registered phrase or keyword. Each domain name may be generated by using an identifier generator 179. When a registered phrase or keyword is detected while consulting a keyword registry 180, a URI link corresponding to the registered keyword or phrase may be retrieved in step 376, otherwise it may be determined in step 380 whether the unregistered keyword or phrase is to be registered. If so, then input 210 may be processed in step 382 as a registration request. A registration request type may be used for the contemporaneous registration of similar identifiers across naming systems or separate namespaces as will be discussed (see FIGS. 9a and 9b).

When a user does not wish to register the available phrase or keyword then it may be determined in step 384 whether input 210 includes any prefixes by consulting the prefix database 176. If so, then a prefix request is processed in step 386 from input 210, otherwise input (e.g., having/selecting/generating a search request type) may be processed in step 218 as a search request or AutoSearch. In any case (steps 368, 376, 382, 386, 218), when domain name availability is determined, or a URI retrieved from a registered phrase, or a registration or prefix request is processed, or input is processed as a search request/AutoSearch then results from all request types are retrieved and combined in step 388, and results if any, are provided in step 222.

FIG. 4a is a top-level flowchart showing a new combination of steps in accordance with the present invention for processing name resolution services. As discussed in FIG. 2a when a valid URI having a valid domain name generated in step 238 or received as input in step 234, URI accessibility may then be determined in step 242. As previously explained and shown in FIG. 2b, one step in determining URI accessibility is the determination of domain name resolvability in step 260. Rather than displaying an error message in step 230 or processing a search request in step 218 in response to the determination of an unresolvable domain name in step 260, in a preferred embodiment of the present invention the inaccessible URI may instead be redirected to registration services where the unresolvable domain name is automatically used to perform a registration request in step 410 to determine domain name availability in step 314. When the domain name is determined available (as in step 314), a registration form may be displayed (as in step 360) as a result of processing the registration request in step 410.

FIG. 4b is a top-level flowchart showing how an error message may be used in accordance with the present invention. As discussed in FIG. 2a when a valid URI having a valid domain name generated in step 238 or received as input in step 234, URI accessibility may then be determined in step 242. As previously explained and shown in FIG. 2b, one step in determining URI accessibility is the determination of domain name resolvability in step 260. Rather than automatically processing a registration request in step 410 or processing a search request in step 218 in response to the determination of an unresolvable domain name in step 260, in an alternative embodiment of the present invention a web page 150 and/or error message (step 230) is provided in step 415 having at least one hyperlink to perform a WHOIS request (step 344) on the unresolvable domain name and/or process the unresolvable domain name as a registration request in step 410. Such a web page or error message having at least one hyperlink in step 415 may be provided when a domain name or IP address is determined not valid (step 266 or step 228) and does not rely upon having to determine domain name resolvability (step 242) as a prerequisite step. In addition, further options such as performing a search request (step 218) or modifying configuration settings 174 may also be included as hyperlinks in such a resulting web page or error message.

FIG. 4c is a flowchart illustrating the steps performed for generating a valid URI in response to determining that an existing valid URI is inaccessible. When a URI is determined in step 234 to be valid, it may be determined in step 242 whether the valid URI is accessible. When the valid URI is accessible, results if any, may be provided in step 222. However, when the valid URI is not accessible, then a spell check program 182 may be applied in step 425 to the URI and/or similar URIs from input history 212 may be located as a means for selecting another URI. A valid URI may also be generated in step 430 to access content by extracting keywords from the non-query components of the previous inaccessible URI and using such keywords as a search request or as the query portion of the generated valid URI. Such a URI generation method is explained in U.S. Provisional Application Ser. No. 60/152,015 filed Sep. 1, 1999, by Schneider, et al., entitled "Method and apparatus for using a portion of a URI as a search request", which is herein incorporated by reference.

A banner ad or the like that corresponds to the extracted keywords may be selected from an advertising cache 184 and/or an ad having available domain names that are generated by forming extracted keyword combinations including prefixes and/or suffixes may be created in step 435. Such ad selection methods from extracted keywords are explained in U.S. Provisional Application Ser. No. 60/153,594 filed Sep. 13, 1999, by Schneider entitled "Method and apparatus for using a portion of a URI to select and display advertising", which is herein incorporated by reference. After a URI and advertisement is either selected or generated, it may be determined in step 440 whether there have been too many attempts in finding an accessible URI. When there are too many attempts, an error message may be displayed in step 220 otherwise steps (242, 425, 430, 435, 440) may be repeated until the URI is determined accessible in step 242.

FIG. 5 illustrates user modifiable configuration settings 174, which may be accessed for determining how to process an input request. Configuration settings 174 may include general features 504, search features 506, and registration features 508. General feature settings 504 may include a method for selecting redirection to a registrar and/or search engine. Such settings may further include the enabling of a watch list, prefixes (e.g., registration commands), and/or the enabling of metalinks. Enhanced search features 506 may include combining search results with the generation of domain names in response to a search request and/or providing a means for registering any input determined to be available (e.g., VDN, FDN, keyword or phrase). Enhanced registration features 508 may include combining registration results with the results of a search request from the input of a registration request and/or the ability to include resource location in response to a registration request. Other configuration settings that are not shown may be applied by those skilled in the art to perform any aspect of the present invention.

Redirection from search services to registration services and vice-versa may be employed by selecting (multiple request types) search and/or registration vendors from a vendor database 186. Any and all search criteria may be predetermined/preselected. For example, search site A may be preselected in configuration settings 174 while a select box of registration vendors or registration service providers (RSPs) is displayed on a web page. The pages may have the look and feel of a Registrar Portal. In turn, registration site B may be preselected in configuration settings 174 while a select box of search vendors is displayed on a web page. The pages may have the look and feel of a Search Portal. A portal to portal (P2P) exchange site or "Metaportal" may be created to broker access between search portals and registrar portals. Included on the metaportal are the options to select both a search service and registration service. The metaportal may be distributed and take the form of a banner ad, a web page control frame, servlet, applet, script, etc.

Figure 6A:
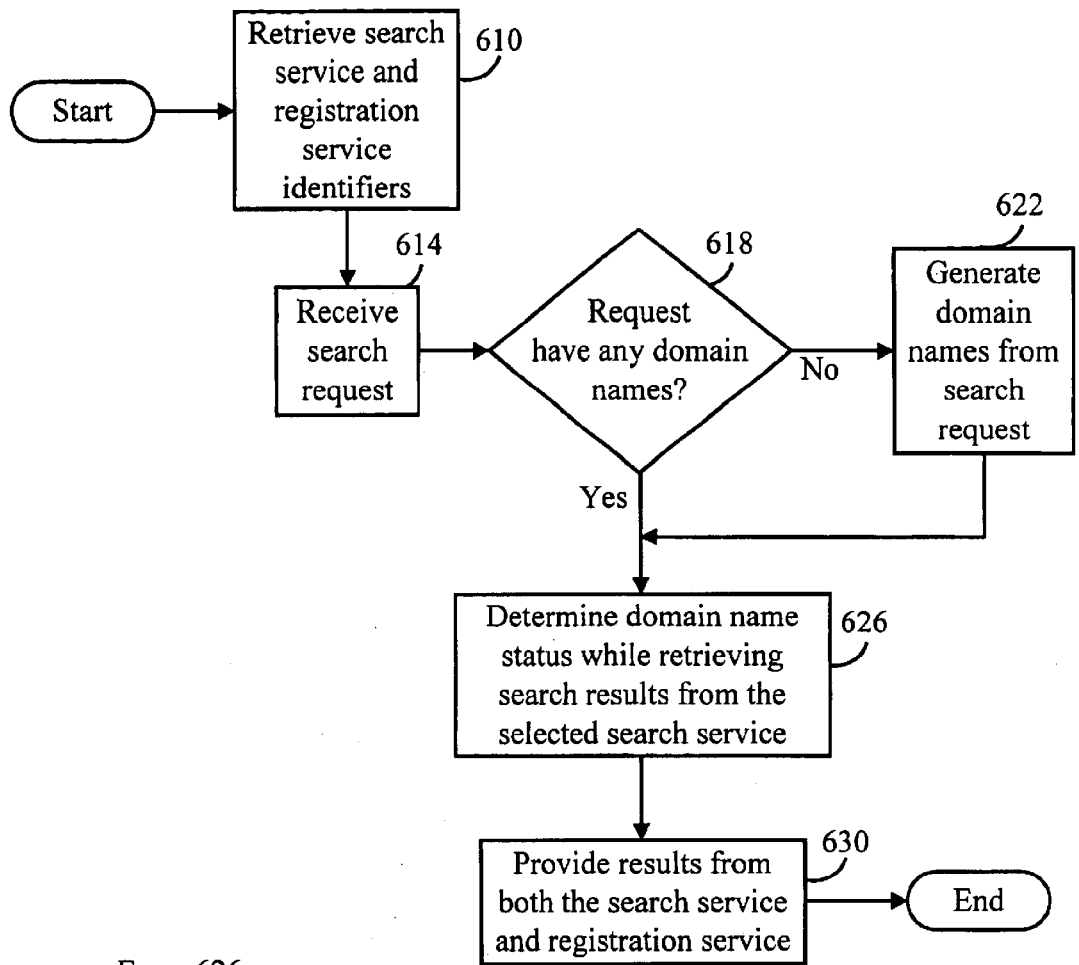
FIG. 6a is a flowchart illustrating the steps performed for determining domain name status in response to a search request in accordance with the present invention.

FIG. 6a is a flowchart illustrating the steps performed for integrating domain name registration services with search services. When search service and registration service vendors/identifiers are retrieved in step 610 and a search request is received in step 614 then it may be determined in step 618 whether the search request includes any domain names. If not, then domain names are generated in step 622 from the search request and the status of any domain names that are either generated and/or provided are determined in step 626 while retrieving search results from the selected search service. Results may be provided in step 630 from both the search service and/or registration service. In effect, a many-to-many data request system is employed by selecting and/or generating multiple identifiers (e.g., keywords and domain names) with multiple request types (e.g., search vendor and registration vendor).

Figure 6B:
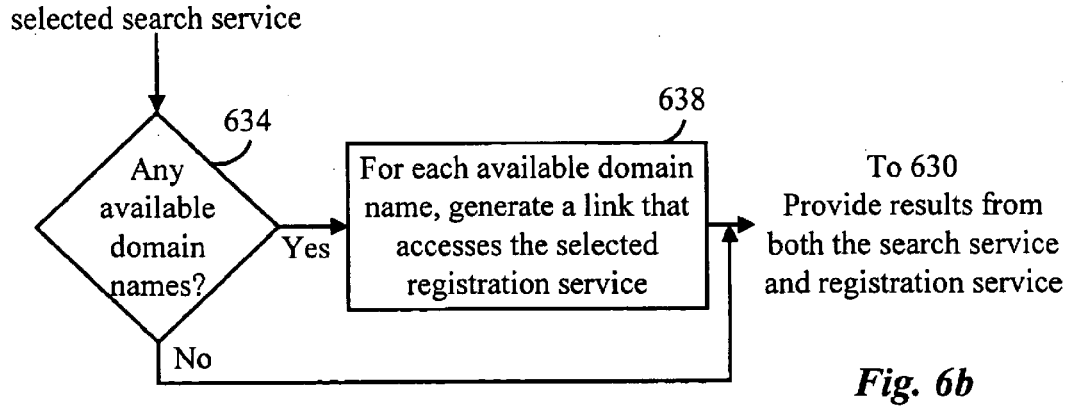
FIG. 6b is a flowchart illustrating the steps performed for determining domain name availability and integrating registration services in response to a search request in accordance with the present invention.

Domain name status may be represented as a property having attributes such as availability for registration, an auction bid, a listed valuation, etc. Though, all generated domain names may be listed with a link to access status, FIG. 6b illustrates steps performed for processing domain names that specifically have an available status. After status is determined in step 626, then it may be determined in step 634 whether any domain names are available for registration. If so, then for each available domain name, a link is generated in step 638 that accesses the selected registration service as discussed in FIG. 6a and all results are provided in step 630 from both the search service and/or registration service.

Figure 6C:
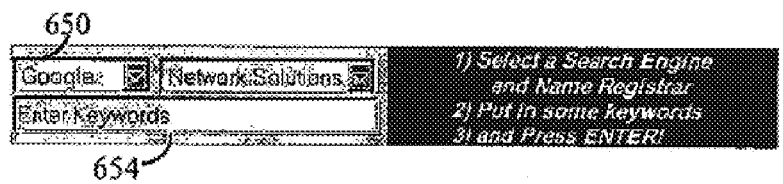
FIG. 6c is an illustration of a banner ad depicting how a search service vendor and registration service vendor may be selected in addition to providing a search request in accordance with the present invention.

FIG. 6c depicts how a banner ad may be used to provide input to steps discussed in FIG. 6a, for example. Included in the banner is a select box for choosing a search service 650, a select box for choosing a registration service 652, and an input box for entering domain names or keywords 654. By using the banner ad, parameters such as search service and registration service identifiers, and a search request may be provided and determined for use in the many aspect discussed of the present invention. Again such a banner ad is an example of a distributed many-to-many data request system.

Other service identifiers/providers may include information services, reference services, knowledge base services, web hosting, publishing services, ISP/ASP services, Telco services, incorporation services, trademark services, bookmark services, mapping services, image services, delivery services, messaging services, conferencing services, name resolution services, redirection services, registry services, renewal services, alert services, escrow and transfer services, valuation and auction/listing services, etc, which may be listed in the vendor database 186. Furthermore, the input box of a search request may be more specifically displayed as an input box for entering identifiers/labels and a select box for choosing a context or namespace for the entered identifier/labels. Such a banner type advertisement may be distributed as a Java applet or in the form of a "Dot", for example. "Dots" are packaged pieces of branded Internet content and applications that reside on the desktop with any application. Further readings of "Dot" technology is provided by DoDots, Inc. and can be located at "www.dodots.com". Such technology may be utilized by those skilled in the art in accordance with the present invention.

Figure 6D:
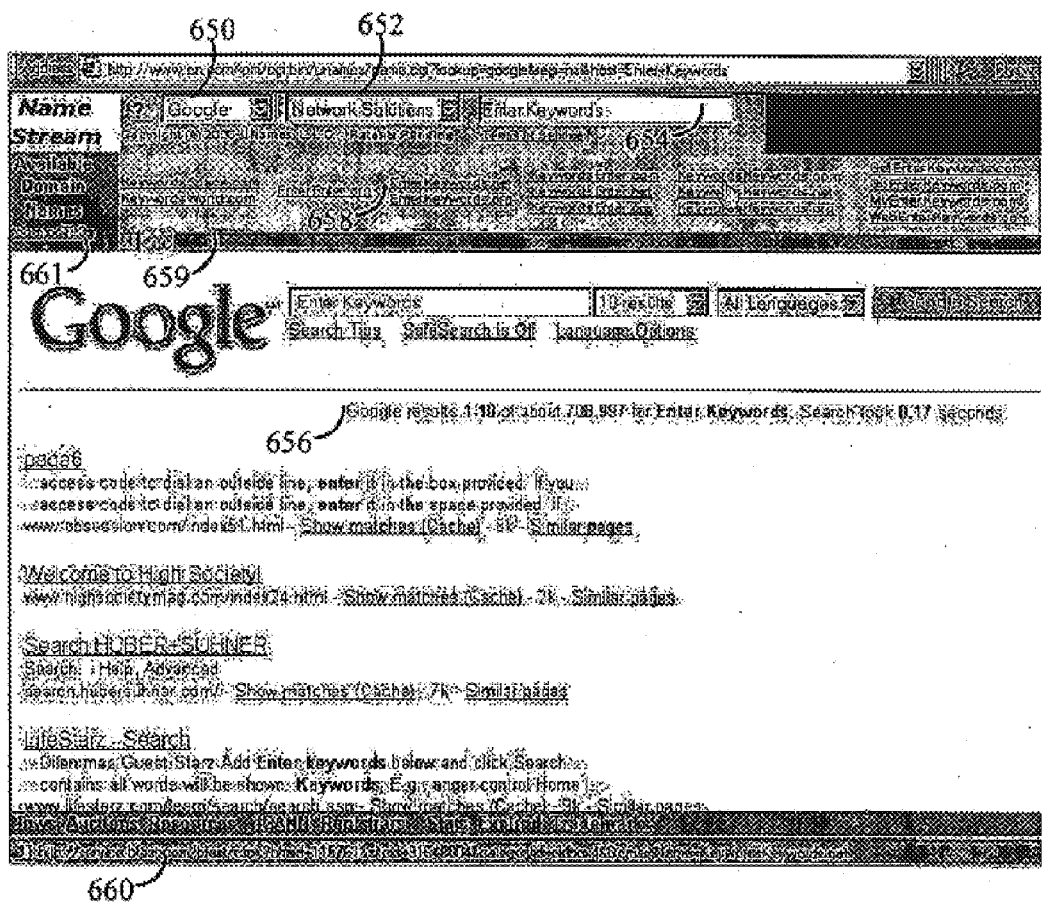
FIG. 6d is an illustration of a web page depicting search results of input provided from the banner ad shown in FIG. 6c in accordance with the present invention.
Figure 6E:
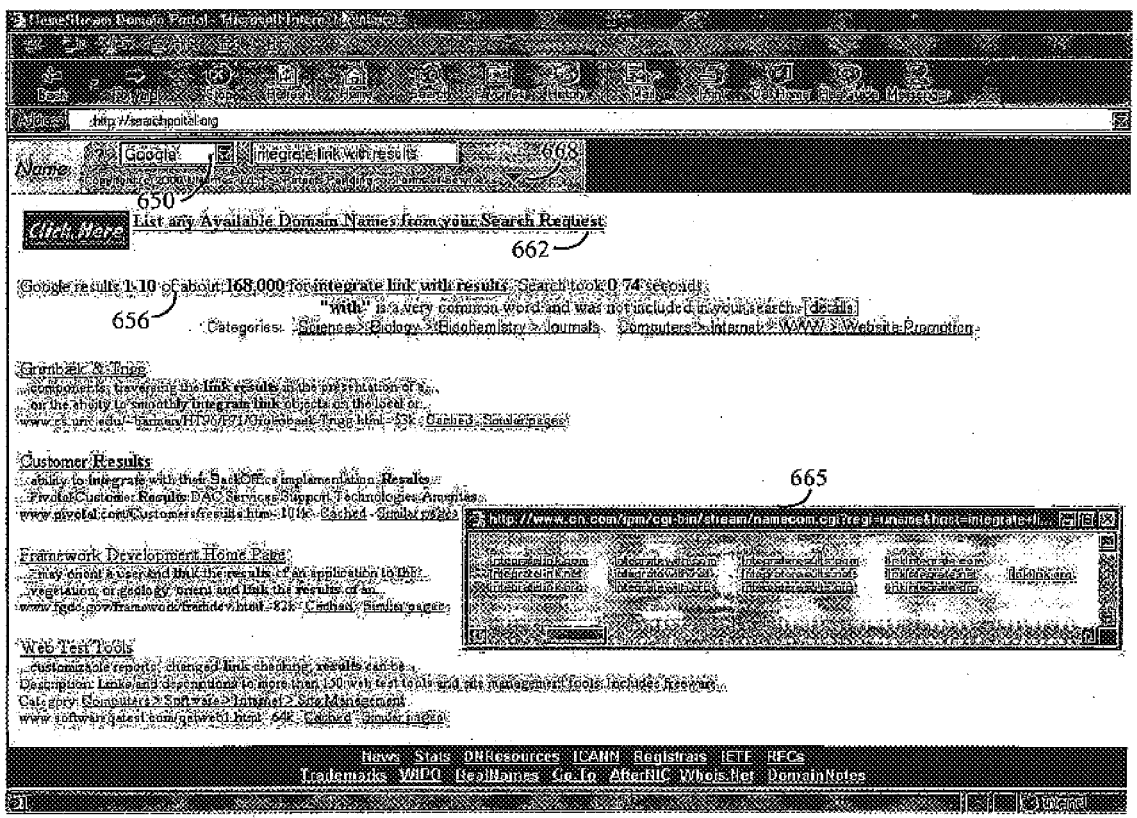
FIG. 6e is an illustration of a web page depicting how a hyperlink that accesses available domain names may be combined with search results in accordance with the present invention.

FIG. 6d depicts a typical output when processing input parameters such as those discussed in FIG. 6c. More specifically, the screen shot illustrated in FIG. 6d represents a new kind of portal service. Users may now be able to select vendors or portals across separate systems and combine the separate results from each service into a unified result of a new integrated service or portal. Depicted at the top of the web browser screen shot are the parameters (650, 652, 654) discussed in FIG. 6c. Search results 656 from a selected search service 650 and available domain names 658 from a selected registration service 652 are displayed. The status bar 660 of the web page displays the URL of the highlighted available domain name 658 displayed in an identifier status region 659. The displayed URL is generated from an affiliate program that redirects the URL to the selected registration service 652. A TLD selector region 661 having TLD generator links is also displayed, which enables a user to readily determine domain name availability in both gTLDs and ccTLDs. As discussed previously, the select boxes (650, 652) may be omitted in applications where the selection of search service and registration service has been predetermined. FIG. 6e is an illustration of a web page depicting how a hyperlink that accesses available domain names may be combined with search results. A hyperlink 662 with the label "List any Domain Names from your Search Request" is displayed contemporaneously with search results 656 from a selected search service 650. Upon accessing content from the hyperlink 662, a pop-up box 665 having links of available domain names is displayed, wherein each link accesses a registration request. A graphical image of an arrow 662 is displayed and may be used to remove the displayed hyperlink 662 and instead display the identifier status region 659 (e.g., available domain names). The choice of display may benefit any content intensive site where display space is a commodity. By displaying a hyperlink 662 instead of the identifier status region 659, more display space is available for other uses such as generating revenue from other content (e.g., banner ads, etc.).

Figures 6F, 6G:
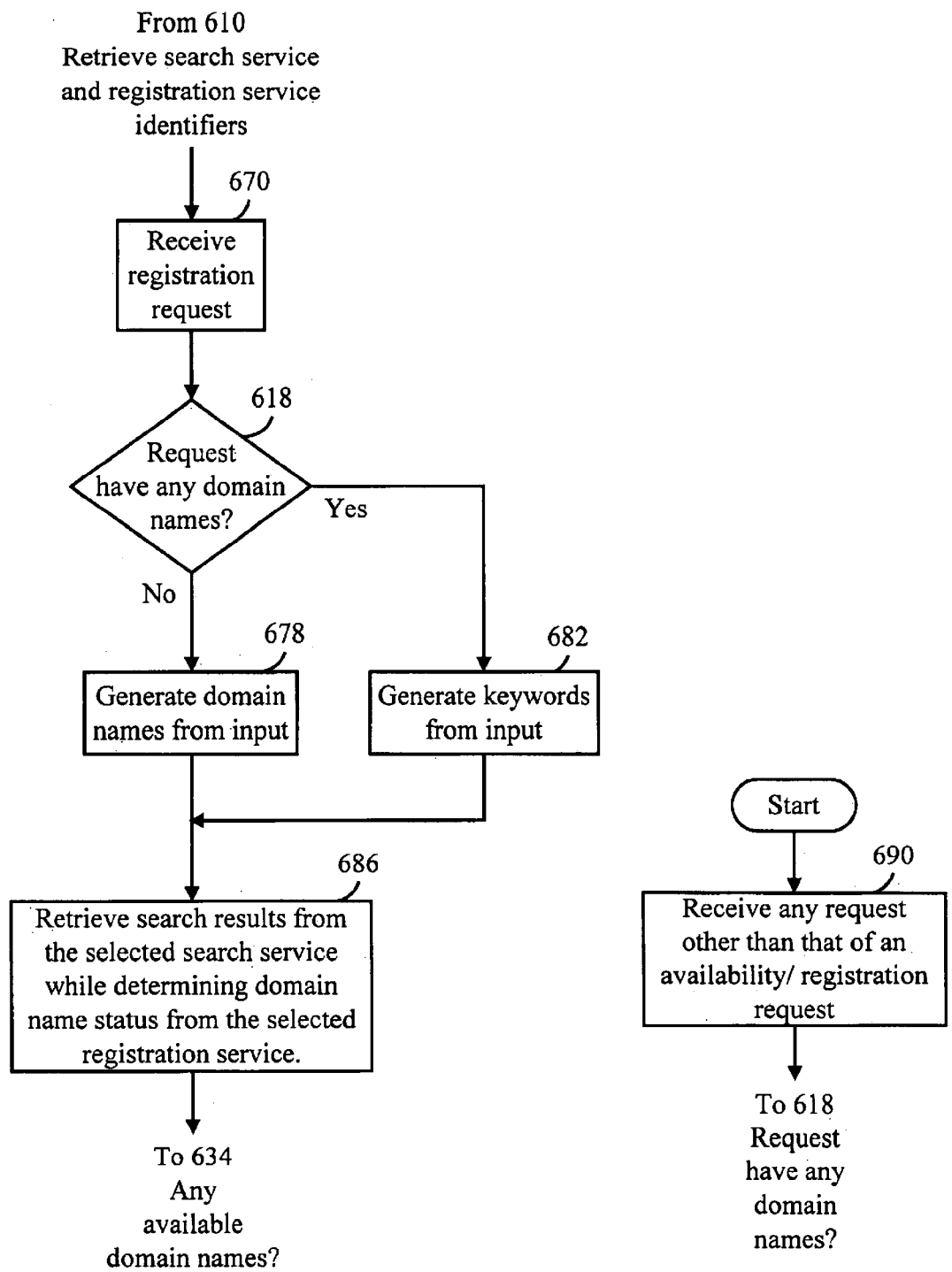
FIG. 6f is a flowchart illustrating the steps performed for providing search services in response to a registration request in accordance with the present invention.
FIG. 6g is a flowchart illustrating the step performed for receiving any request other than that of a registration request in accordance with the present invention.

FIG. 6f is a flowchart illustrating the steps performed for integrating search services with domain name registration services. Similar to the steps illustrated in FIG. 6a, when search service and registration service identifiers are retrieved in step 610 and a registration request is received in step 670 then it may be determined in step 674 whether the registration request includes any domain names. If not, then domain names may be generated in step 678 from the registration request otherwise keywords may be generated in step 682 from the registration request and the status of any domain names or keywords that are either generated and/or provided are determined in step 686 while retrieving search results from the selected search service. It then may be determined in step 634 whether there are any domain names available for registration. In effect, keywords may be generated from domain names of a registration request whereas domain names may be generated from keywords of a search request as a means to provide more meaningful results from the originating request. A broader step is illustrated in FIG. 6g where any request other than that of an availability/registration request is received in step 690, before determining in step 618 whether the request may include any domain names.

Figure 7:
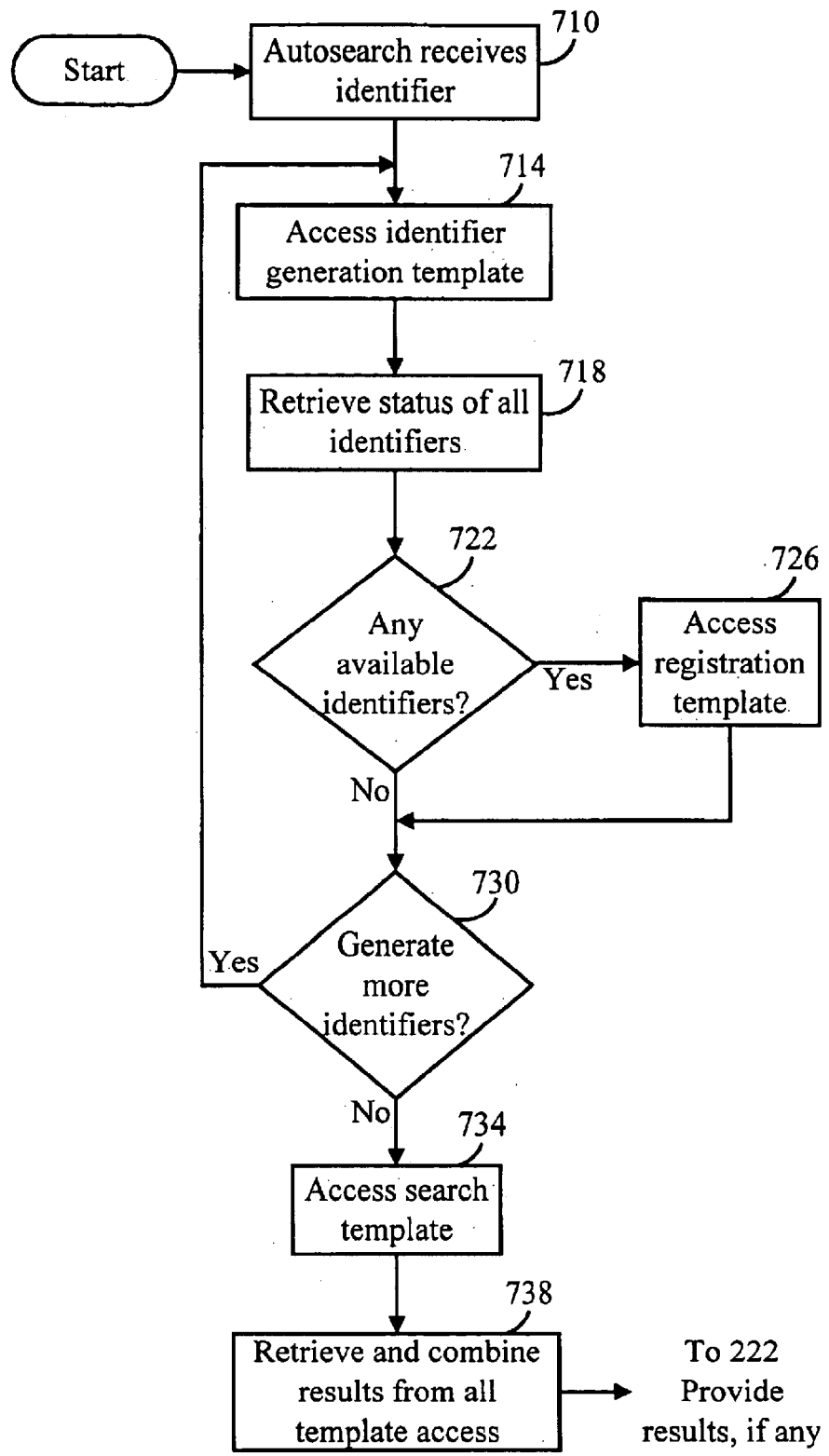
FIG. 7 is a flowchart illustrating the steps performed for generating identifiers, determining identifier availability, and registering identifiers in response to activating an auto-search in accordance with the present invention.

FIG. 7 is a flowchart illustrating the steps performed for processing a search request by performing an AutoSearch. When the AutoSearch feature receives an identifier from input in step 710, an identifier generation template 188 is accessed in step 714. The template 188 may be used in conjunction with the identifier generator 179 to generate similar and/or matching identifiers across multiple naming systems from input identifiers (e.g., "cars" as input may yield "cars.net" or "fastcars.com", whereas "fastcars.com" as input may yield "cars", "fast.cars", or "1-800-555-CARS", etc.). As the status for each identifier is retrieved in step 718, it then may be determined in step 722 whether the status of any identifiers are available for registration.

Figures 10A, 10B:
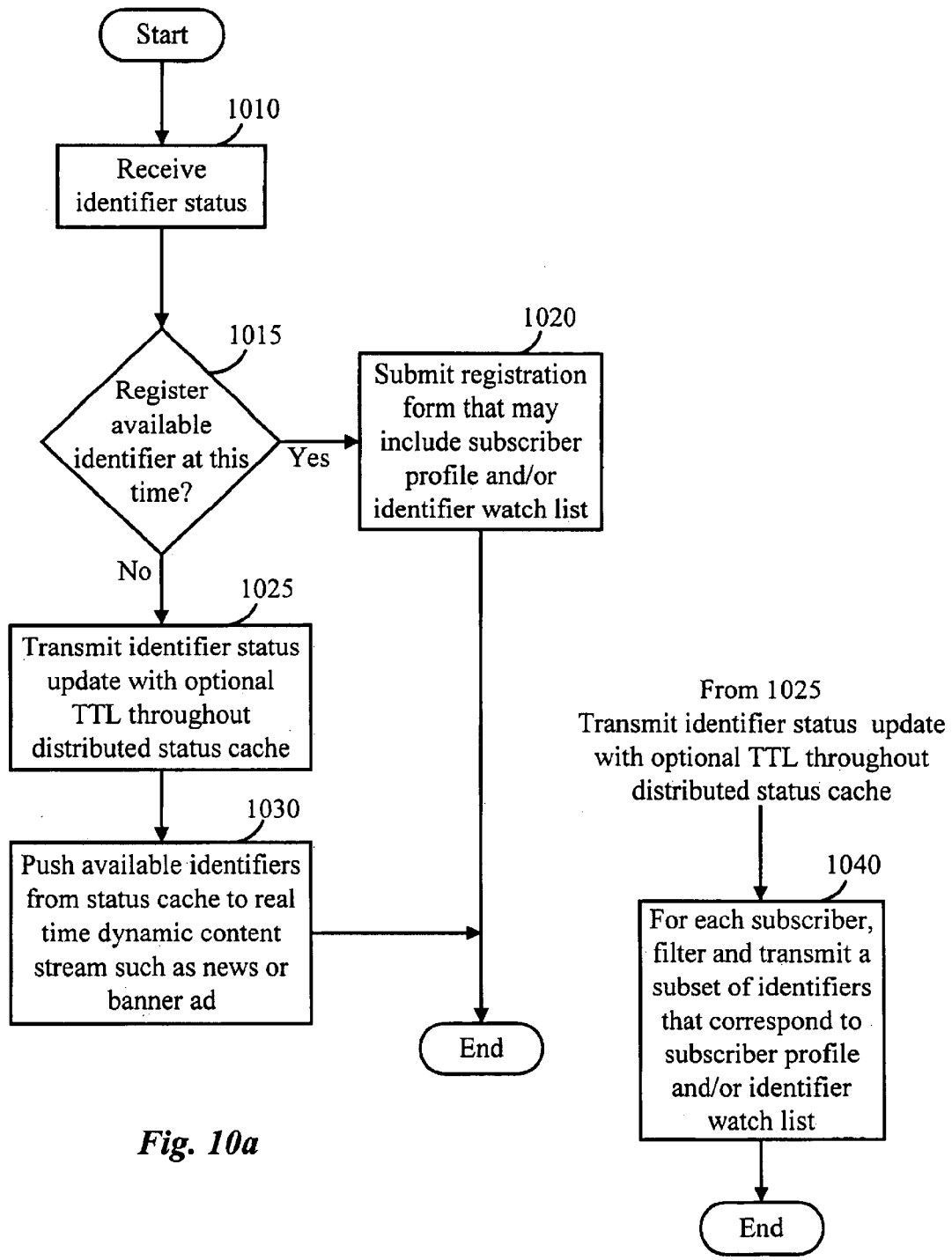
FIG. 10a illustrates the steps performed for updating a distributed identifier status cache throughout a network in accordance with the present invention.
FIG. 10b illustrates the steps performed for delivering custom available identifier information to subscribers in accordance with the present invention.

One method may be to consult an identifier status cache 190 (see FIG. 10a). When it is determined in step 722 that any identifiers are available, a registration template 188 may be accessed in step 726. The registration template 188 may be used to generate a link, a registration page, and/or a redirection request to enable a user to have the option to register any available identifiers. After the registration template 188 is accessed or when there are no available identifiers, it may then be determined in step 730 whether to generate any more identifiers. If so, then steps (714, 718, 722, 726) may be repeated as needed until it is determined in step 730 that no more identifiers are to be generated. After the processing of any identifiers, a search template 188 may be accessed in step 734. Results from all template 188 access may be retrieved and combined in step 738, and results if any, are provided in step 222

Another aspect of the present invention detects and/or generates identifiers (e.g., via the identifier generator 179) in real time from input sources such as instant messaging, chat rooms, web conferencing, interactive television, any television broadcast, cable, satellite, video tape, DVD, and other sources that have a digital, analog or digital/analog signal where text can be decoded from. U.S. Provisional Application Ser. No. 60/153,336 filed Sep. 10, 1999, by Schneider entitled "Method and apparatus for generating hyperlink references and/or performing an operative function in response to detected indicia", explains how such input sources may be used generate identifiers.

There are a variety of systems available for multiplexing and transmitting character and graphic information during the vertical retrace line period of video signals, such as television signals. This type of system includes, for instance, the character information broadcasting system in Japan; the world standard teletext (WST); the extended version of the United Kingdom teletext system; the closed caption system of the U.S.A., etc.

Video data frequently includes data, such as closed caption text data, that is transmitted during the vertical-blanking interval (VBI). The closed caption text data is typically transmitted during line 21 of either the odd or even field of the video frame in a National Television Standards Committee (NTSC) format. Closed caption decoders strip the text data from the video signal, decode the text data, and reformat the data for display, concurrent with the video data, on a television screen. Such closed caption decoders process the text data separately from a video signal. The closed caption data is displayed substantially in real time.

The associated data encoded in the vertical blanking period of the NTSC signal comprises digital data. The digital data may include ASCII text, any alpha numeric coding, or graphical information. Because the digital data is encoded in the vertical blanking period, the audio/video content in the NTSC signal is not disturbed. The associated data may comprise a wide variety of information pertaining to the audio/video content, such as news headlines, programming details, captioning for the associated audio/video, classified advertisements, and weather.

In a conventional TV set, teletext information is decoded from the broadcast video signal with the use of dedicated hardware that processes the data and displays it on the TV screen. In a teletext capable PC, this same dedicated teletext hardware is used to extract and process the teletext information from the video stream and then store it until the processed teletext information is sent to the host computer. The host computer then runs a software application that receives the processed data and formats it for display on the computer screen.

Currently, many PC-TV products allow a user to view TV on a computer monitor. Some products allow information to be viewed with the addition of appropriate hardware, typically a module that plugs into the TV card. Typically, a TV tuner receives a signal from either an antenna or cable connection. The selected channel is output from the tuner to the TV decoder chip and to the teletext decoder chip.

Advancements have been made to enable decoding to extend beyond that of a dedicated chip or processor to include software drivers to perform this task. A client application running on PC calls closed caption decoder driver in order to enable and disable the displaying of closed caption data. All application calls are made to closed caption capture layer (CCC) by client application. Capture layer extracts the Line 21 data from video processor hardware using hardware driver and notifies decoding layer that there is data available to process. Decoding layer then processes the data retrieved by capture layer and displays the closed caption text on the monitor in a window specified by client application.

FIG. 8a illustrates the steps for performing requests in response to decoding text data from a broadcast. A device receives a broadcast in step 810 and decodes text data in step 815 from the broadcast signal. Data is then stored and parsed in step 820. It may be determined in step 825 from configuration settings 174 whether to retrieve the status for each identifier from the stored data. If so, then identifiers may be generated (e.g., via an identifier generator 179 or templates 188) across multiple naming systems from input and their status determined in step 830. Data may then be processed in step 835 based on request type including a prefix request, suffix request, command request, resolution request, search request, registration request, commerce request, subscription request, navigation request, dialing request, messaging request, conferencing request, service request, authorization request, and/or reference request and the like.

Data request results if any, may then be provided in step 222. For instance, as closed caption text is decoded, domain names and/or identifiers across multiple namespaces may be generated (e.g., via an identifier generator 179 or templates 188) in response to receiving the closed caption text. Upon identifier generation, identifier status may be performed including the determination of whether such generated identifiers may be available for registration (e.g., keywords, FDNs, VDNs, MDNs, telephone numbers, etc). When a registration request is performed, for example, all such generated identifiers that are available for registration may be simultaneously registered with respect to the naming systems of all the selected identifiers.

Simultaneous registration of identifiers across naming systems is explained in U.S. Provisional Application Ser. No. 60/175,825 filed Jan. 13, 2000, by Schneider, entitled "Method and apparatus for determining the availability of similar identifiers across naming systems" and U.S. patent application Ser. No. 09/650,827 filed Aug. 30, 2000, by Schneider, entitled "Method, product, and apparatus for determining the availability of similar identifiers across naming systems" and is discussed in more detail (see FIGS. 9a, 9b, and 10c).

By applying this method to an interactive television application, a viewer may select a list box for display. Upon display, all identifiers that have an available status, for example, may be dynamically populated within the selected list box as a hyperlink reference for each available identifier to access registration services. In effect, available identifiers may be generated across multiple naming systems in response to real-time data streams and pushed across various media to help users find desirable available identifiers on the fly.

FIG. 8b illustrates how identifiers may be generated in response to audio input. When an audio stream is received as input in step 840, speech from the audio source may be converted into text in step 845 by a speech to text conversion program with such converted data stored and parsed in step 820. FIG. 8c illustrates how identifiers may be generated in response to receiving the page source of a URI. When a page source of a URI (e.g., e-mail, news, web page, etc.) is received as input in step 850, such input is then stored and parsed in step 820. FIG. 8d illustrates how identifiers may be generated in response to receiving any request other than that of a registration request. When any request other than that of an availability/registration request is received in step 690, such input is then stored and parsed in step 820. Furthermore, decoded closed caption text and speech to text conversion from an audio source may also be used in interactive television applications as an input source to navigation services such as Flyswat, GuruNet, Annotate.com, and Third Voice.

Figure 9A:
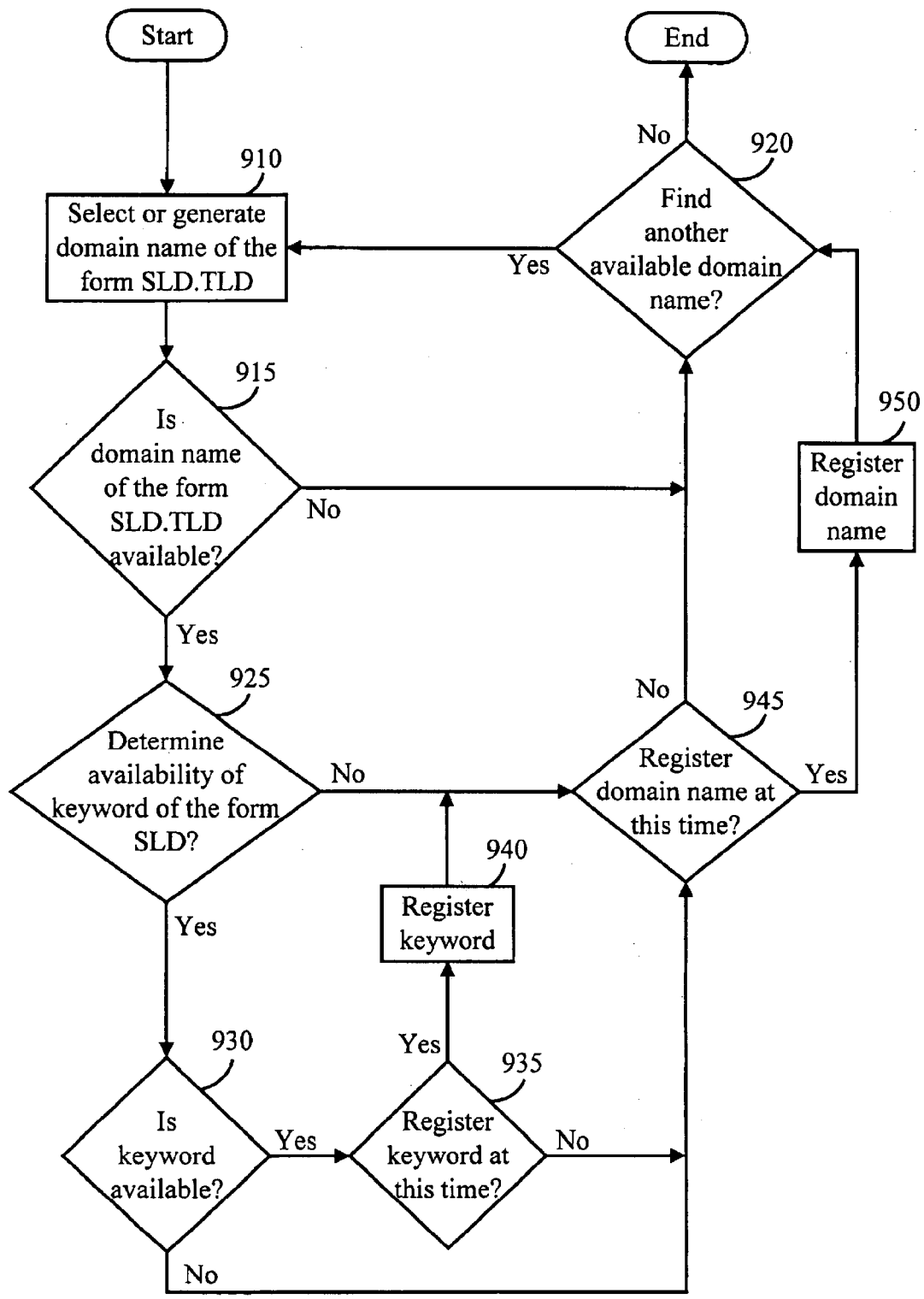
FIG. 9a is a flowchart illustrating the steps performed for integrating the simultaneous registration of domain names and other identifiers such as keywords in accordance with the present invention.

FIG. 9a illustrates the steps performed for the simultaneous registration of domain names and keywords. When a domain name of the form SLD.TLD (e.g., "example.com") is selected in step 910, it may then be determined in step 915 whether the selected domain name is available for registration. If no domain name is available (step 915) and it is determined in step 920 that another available domain name is to be found then steps (910, 915, 920) may be repeated until a domain name is available for registration. When the domain name is available, a keyword of the form SLD (e.g., "example") may be generated and determined in step 925 whether the keyword is to be checked for availability (e.g., via keyword registry 180). When the keyword is determined available, and further determined in step 935 that the keyword is to be registered at this time, then the keyword may be registered in step 940. After the keyword is registered or when the keyword is determined not available or when an available keyword is not to be registered at this time, then it may be determined in step 945 whether the domain name is to be registered at this time. If so, then the domain name may be registered in step 950. After registration or when it is determined that a domain name is not registered then it may be determined in step 920 whether another available domain name is to be found.

In effect, the availability of an identifier such as a domain name may be determined across other naming systems such as a keyword registry (or vice-versa) operated by a resolution service provider (e.g., RealNames or Netword) or operated by the search services of a portal web site or the like (e.g., Alta Vista, Lycos, Netscape, AOL, etc.) or by any other entity that registers keywords for the purpose of directory placement or advertising. For instance, the search for the availability of a RealNames Internet Keyword called "example" or the like is determined in response to the determination that the domain name "example.com" is available for registration and is concurrently displayed to the potential registrant. In turn, the availability of "example.com", "example.net", etc. may be determined in response to determining that the keyword "example" is available for registration. Furthermore, when availability across a plurality of naming systems is determined, then a registration interface having a universal identifier registration form 192 may be used to simultaneously register a plurality of identifiers across a plurality of naming systems with a single registration form.

Figure 9B:
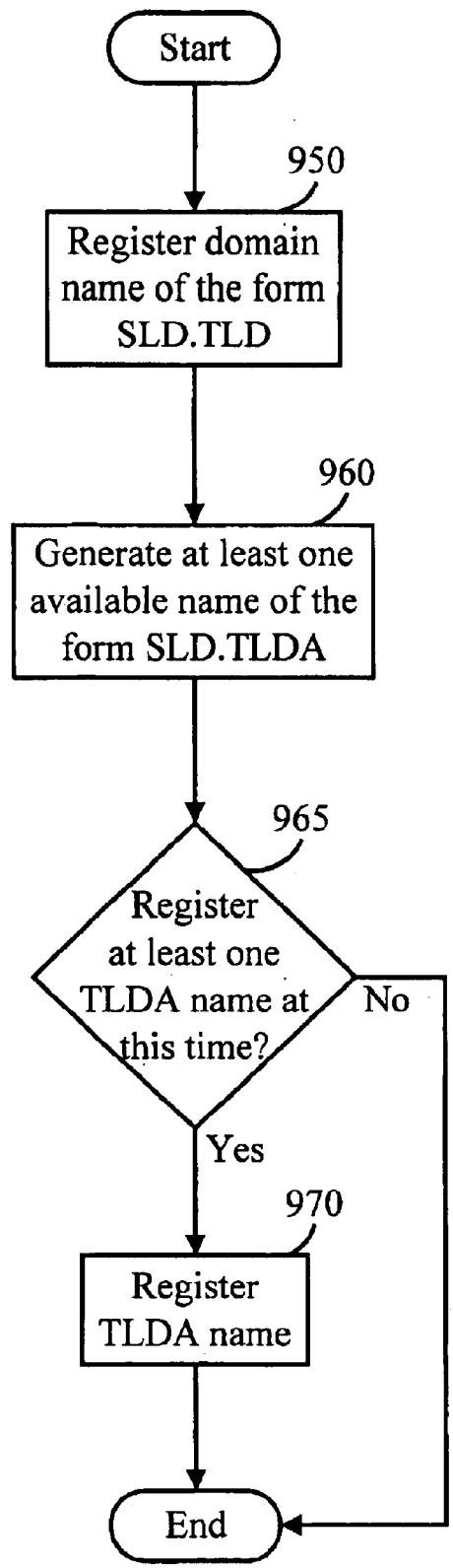
FIG. 9b is a flowchart illustrating the steps performed for integrating the simultaneous registration of valid domain names and fictitious domain names in accordance with the present invention.

FIG. 9b illustrates the steps performed for the simultaneous registration of both valid and fictitious domain names. A valid domain name of the form SLD.TLD (e.g. "example.com") is registered in step 950 and at least one available fictitious domain name of the form SLD.TLDA (e.g. "example.name") is generated in step 960 and provided for further registration in response to the registration of the valid domain name (FDN availability may be determined via the FDN registry 178). It may then be determined in step 965 whether any available TLDA names are to be registered at this time. All selected TLDA names may then be registered in step 970. After TLDA registration or when no TLDA names are registered, steps may be repeated to register other available domain names. For instance, when the domain name "example.com" is available for registration, the additional selection of available TLDA names (e.g., "example.news", "example.sitemap", "example.411", etc.) may be concurrently displayed for an entity to register a final selection from the list of valid and/or fictitious domain names. Other identifiers such as keywords, phone numbers, etc. may also be concurrently displayed as part of a final selection. Examples of concurrent registration may further include the search of a domain name based on the existing username or handle of an e-mail address (e.g., "myemailaddress.com" is suggested in response to the existing identifier "myemailaddress@example.com").

Also, as discussed the present invention is by no means limited to the registration of identifiers such as domain names (e.g., valid domain names, fictitious domain names including TLDA names, and multilingual domain names), phone numbers (e.g., cell, fax, telecopier, pager, voice, data, etc.), and keywords (e.g., search term, RealName, Netword, Internet keyword, AOL keyword, etc.). Other registerable naming systems having one or more registerable namespaces may include identifiers such as but not limited to Publisher Item Identifier (PII), Digital Object Identifier (DOI), Inter Deposit Digital Number (IDDN), International Standard Book Number (ISBN), International Standard Technical Report Number (ISRN), International Standard Serial Number (ISSN), Serial Item and Contribution Identifier (SICI), Book Item and Component Identifier (BICI), European Article Number (EAN), Universal Product Code (UPC), Standard Address Number (SAN), International Standard Audiovisual Number (ISAN), International Standard Work Code (ISWC), International Standard Music Number (ISMN), International Standard Recording Code (ISRC), Intellectual Property Identification (IPI), Uniform File Identifier (UFI), Uniform Resource Identifier (URI), Persistent Uniform Resource Locator (PURL), Universally Unique Identifier (UUID), Globally Unique Identifier (GUID), Namespace Identifier (NID), Bank Identification Number (BIN), Personal Identification Number (PIN), Mod 10 Number, credit card number, Electronic Serial Number (ESN), Mobile Identification Number (MIN), Automatic Number Identification (ANI), Social Security Number (SSN), Employer Identification Number (EIN), Taxpayer Identification Number (TIN), Vehicle Identification Number (VIN), World manufacturer identifier (WMI), Manufacturer Identification Number (MIN), Market Identifier Code (MIC), Standard Industrial Classification (SIC), Standard Occupational Classification (SOC), Stock Keeping Unit number (SKU), International Business Entity Identifier (IBEI), Institution Identification Code (IIC), National Provider Identifier (NPI), Dunn and Bradstreet Number (DUNS), SEC file number, patent number, trademark number, serial number, charter number, policy number, certification number, document identifier, reference number, invoice number, transaction identifier, validation code, account number, merchant code, reseller code, affiliate code, authorization code, network identifier, user identifier, PGP key, digital certificate, driver license number, license plate number, trademark, servicemark, tradename, fictitious name, company name, DBA, AKA, stock symbol, station identifier, broadcast station call letters, ham radio call letters, broadcast frequency number, street name, street address, ZIP code, IP address, host, e-mail address, ICQ number, nickname, screen name, username, alias, handle, document title, book title, song title, movie title, phrase, slogan, machine readable code, glyph, image, icon, animation, sequence of musical notes, date, time, name, abbreviation, mnemonic, moniker, label, alphanumeric, string, character, symbol, token, integer, and number, etc.

Some naming systems may include a domain name system, fictitious domain name system, multilingual naming system, keyword system, telephone naming and numbering system, user naming system, address system, date/time system, language system, Dewey decimal system, catalog naming system, document system, resource naming system, image naming system, geographic naming system, Government naming system, identification naming system, and/or any other naming system that supports any listed identifier. Other examples of naming systems may include languages. Name generating programs may further include language translation as a means for selecting similar identifiers. The mapping of delimiters across all naming systems (not shown) may also be used as a means for similar identifier selection. Each naming system may be the primary registrar with respect to registering on behalf of registrars of other naming systems for concurrent registration. An open architecture system is implemented such that existing or future-naming systems may be easily integrated into alternate embodiments of the present invention. Each integrated system remains highly configurable to the specific context of the application.

Furthermore, each naming system may readily be integrated into a registration interface having a universal identifier registration form 192 assuring a robust system for registrants to easily register multiple identifiers from a single form 192. In effect, the registration form 192 may include a plurality of registration user interface elements for selecting from one of a plurality of identifiers and a plurality of naming systems. In addition, naming system providers may supply metadata to authorize their namespace/naming system to couple with the registration form 192 to enable users to register available identifiers through their naming system.

Identifier generation may be provided from the identifier generator 179, which is configured to select identifiers from a number of criteria by consulting from one of a word generation method, category of interest, dictionary, thesaurus, prefix, suffix, word root, word stem, set of heuristic naming rules, namespace syntax, identifier equivalent, language translation, phonetic spelling, phonemes, identifier watch list, list of desirable descriptors, personal identifier portfolio, competitor identifier portfolio, mnemonic method, abbreviation, namespace mapping, identifier mapping, delimiter mapping, rhyming method, name-to-number conversion, number-to-name conversion, and identifier history.

Typically, when the current status of an identifier is queried, the results of such a query are reported without providing additional steps. There are no systems or methods in place that make further use of such status updates. Due to the ever-increasing volume of identifier status queries, it may be desirable to employ methods for reducing network bandwidth when determining identifier status. For example, when an identifier is determined available and a user elects not to register the identifier further steps may be taken to gain further use from such results. By reusing such query results in a cache, for example, network bandwidth may be reduced and/or minimized when similar queries are performed.

FIG. 10a illustrates the steps performed for updating a distributed identifier status cache 190 throughout a network. After an identifier status is received in step 1010, it may then be determined in step 1015 whether to register any identifiers having an available status. If so, then a registration form may be submitted by a user in step 1020 that may include a subscriber profile and/or identifier watch list 194. The user/registrant/subscriber may gain benefit by simultaneously or contemporaneously registering identifiers and a profile/query/watch list including descriptors that are indicative of competitor information and/or geographic, demographic, and/or psychographic information through a universal identifier registration form 192. The profile/list 194 may include keywords of interest to a registrant/subscriber, which may be used at a later time.

Other methods of availability notification, such as notifying a user of soon to be available domain names are explained in U.S. patent application Ser. No. 09/598,134 filed Jun. 21, 2000, by Schneider, entitled "Method and apparatus for integrating resolution services, registration services, and search services." In addition, methods for filtering newly available information to a subscriber may be employed by using a user defined preset query and is explained in U.S. patent application Ser. No. 09/440,606 filed Nov. 15, 1999, by Schneider, entitled "Method and apparatus for information delivery."

When it is determined in step 1015 that an available identifier is not registered, then all identifiers having an available status are transmitted and propagated throughout a series a distributed hierarchical identifier status caches 190 in step 1020 as a status update with optional expiry time/time-to-live (TTL) value. Any available identifiers may then be pushed in step 1030 from the identifier status cache 190 to any real-time dynamic content stream such as news source, banner ad, available domain name (identifier) ticker tape similar to that of streaming stock quotes, or a Java applet and the like. Further use may be gained by recycling such distributed real time query information by using such query results to provide centralized status update information, and in turn, propagated through a distributed system of hierarchical identifier status caches 190 similar to that of how a WHOIS cache 172 or DNS may be updated. These status caches 190 may be employed by registration service providers (RSPs) and the like for the purpose of minimizing network bandwidth.

FIG. 10b illustrates the steps performed for delivering custom available identifier information to subscribers. After identifiers having an available status are transmitted throughout a distributed identifier status cache 190 in step 1020, a subset of identifiers that correspond to a subscriber profile and/or identifier watch list 194 may be filtered and transmitted in step 1040 to each subscriber. In effect, a real-time notification service may be utilized to update subscriber watch list 194 publishing. For instance, a registrant/subscriber may have indicated interest in receiving any updates based on the keyword "stories" while registering the identifier "topstories.st". Meanwhile, a user performed an availability check on the keyword "storytelling" and was informed that "storytellers.cc" is available for registration. Though the user decides not to register such an identifier, the identifier is updated in a distributed status cache 190 and a search is performed to determine which subscribers may have interest in being notified of such availability. All registrants, who have included the word "stories" in their watch list 194 may now receive notification of such an available identifier.

FIG. 10c is a registration form 192 depicting how a user may simultaneously register available identifiers across naming systems and provide descriptors or keywords that serve as a subscriber profile/watch list 194 as discussed in FIGS. 8a, 9a, 9b, 10a, and 10b. A registrant may access a link 1050 which may provide a registrant information window to input a previous registrant handle or current contact information. A list of identifiers that are currently available across many naming systems/namespaces may also be provided 1055 (e.g., via identifier generator 179 or templates 188) for the registrant to choose from. As discussed in FIG. 10b, keywords or descriptors including identifiers representative of competitive interests may be provided 1060 by the registrant/subscriber to be put in a watch list 194 to inform the subscriber of any available identifiers that may become available in the future. Such descriptors may also include any geographic, psychographic, and/or demographic information or those words that may be used to inform the subscriber of identifiers of interest to competitors. In addition, such descriptors or keywords may be suggested through the registration form 192 by accessing a link 1065 which generates similar identifiers to help the subscriber select a desirable watch list/subscriber profile 194. Such registrant/subscriber information may be submitted to a registration provider at any time.

Suggestive selling of available identifiers creates a "push" business model and generates more revenue by targeting desirable identifiers to recipients. A signup form may be pushed in advance to a potential registrant via e-mail or the like, to help expedite the process a registering an available identifier at a later date. For instance, an application for domain name registration requires the novice user to provide a lot of personal information (e.g., contact, billing, and administrative information) as a prerequisite for registering the domain name. However, such a registration form is only provided in response to a domain name that is determined available. Unfortunately, finding an available domain name is a labor intensive process and may even be considered an impulse buy when a desirable domain name is determined available. At the point of registration, the user (particularly a first time user) is bombarded with all of this information up front and may detract the user from completing the registration process.

FIG. 10d is a sign-up form depicting how a user would save time at a later date by providing information in advance. By providing a registration form in advance that is not dependent upon the detection of an available identifier, a user may have the opportunity to learn more about the registration process while minimizing the information needed at the point of available identifier registration. Included in such a form may be the opportunity for a user to subscribe to a watch list, forward such a sign-up form to a friend, or purchase a gift certificate that may be used at a later date for redemption. For instance, until January 2000 a registrant had to purchase a domain name (in .com/.net/.org) for a minimum of two years at average price of $70 making it generally unrealistic to offer an automated gift certificate program. Since January 2000 and due to competition in price, domain names may be purchased for as little as $20 for a single year making it feasible for the first time to offer a widespread domain name gift certificate campaign. To date, there are no such companies providing such programs.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

I claim:

1. A computer-implemented method for processing a first data request having a first identifier and a first request type comprising:

determining whether the first data request can be processed from the first identifier and the first request type;

processing the first data request in response to determining that the first data request can be processed;

automatically selecting a response type having one of a first response method including the first identifier and a second request type, and a second response method including a second identifier and the first request type in response to determining that the first data request cannot be processed;

generating a second data request that can be processed from said response type; and, processing said second data request.

2. The method, as set forth in claim 1, wherein said second data request corresponds to the first data request.

3. The method, as set forth in claim 1, wherein said first response method includes selecting said second request type, said second request type corresponding to the first identifier so that said second data request can be generated and processed from said first response method.

4. The method, as set forth in claim 1, wherein said second response method includes generating said second identifier, said second identifier corresponding to the first request type so that said second data request can be generated and processed from said second response method.

5. The method, as set forth in claim 1, wherein the first request type and said second request type is one of a prefix request, suffix request, command request, resolution request, redirection request, search request, identifier registration request, commerce request, subscription request, navigation request, dialing request, messaging request, conferencing request, vendor request, service request, login request, status request, authorization request, and reference request.

6. The method, as set forth in claim 5, wherein the first request type is any request other than that of said identifier registration request and said second request type is said identifier registration request.

7. The method, as set forth in claim 5, wherein the first data request includes said resolution request and the first identifier, and said processing the first data request includes locating at least one network resource from the first identifier.

8. The method, as set forth in claim 7, wherein said locating said network resource from the first identifier further includes determining whether the first identifier includes a domain name or Internet Protocol (IP) address, generating said second data request from said selected response type in response to determining that the first identifier does not include said domain name or said IP address, and processing said second data request.

9. The method, as set forth in claim 8, wherein said generating said second data request includes determining whether the first identifier includes a prefix, processing said prefix request in response to determining that the first identifier does include said prefix.

10. The method, as set forth in claim 8, wherein said generating said second data request includes determining whether the first identifier includes multiple identifiers, processing said multiple identifiers in response to determining that the first identifier does include multiple identifiers, and processing said search request in response to determining that the first identifier does not include multiple identifiers.

11. The method, as set forth in claim 10, wherein said multiple identifiers include one of a at least one identifier and at least one identifier having one of a prefix and suffix.

12. The method, as set forth in claim 7, wherein the first identifier includes a domain name and said locating said network resource from the first identifier includes determining whether said domain name is one of a fictitious domain name (FDN), valid domain name, multilingual domain name (MDN), resolvable domain name, and domain name available for registration.

13. The method, as set forth in claim 12, further including comparing the first identifier to one of a MDN registry, FDN registry, spell checker, input history, and generator history.

14. The method, as set forth in claim 12, wherein said locating said network resource from the first identifier includes determining whether said domain name is fictitious, generating a second identifier corresponding to an accessible network resource in response to determining that said domain name is fictitious, accessing said network resource corresponding to said second identifier.

15. The method, as set forth in claim 14, wherein said domain name includes a highest level domain (HLD) and said determining whether said domain name is fictitious includes determining whether said HLD is resolvable.

16. The method, as set forth in claim 15, wherein said determining whether said HLD is resolvable includes comparing said HLD to a table of resolvable top level domains (TLDs).

17. The method, as set forth in claim 15, wherein said HLD that is determined resolvable is a TLD and said HLD that is determined not resolvable is a top level domain alias (TLDA).

18. The method, as set forth in claim 12, wherein said locating said network resource from the first identifier includes determining whether said domain name is valid, generating a third identifier in response to determining that said domain name is not valid, accessing said network resource corresponding to said third identifier.

19. The method, as set forth in claim 12, wherein said locating said network resource from the first identifier includes determining whether said domain name is resolvable, determining whether said domain name is available for registration in response to determining that said domain name is not resolvable, providing a registration interface in response to determining that said domain name is available for registration, and providing registrant information in response to determining that said domain name is not available for registration.

20. The method, as set forth in claim 19, further including generating a plurality of identifiers available for registration across a plurality of naming systems wherein at least one naming system of said plurality of naming systems is any naming system other than that of a domain name system (DNS) in response to providing said registration interface.

21. The method, as set forth in claim 20, wherein said registration interface includes a universal identifier registration form having a registration user interface element for selecting from said plurality of identifiers available for registration and said plurality of naming systems.

22. The method, as set forth in claim 21, further including contemporaneously registering said selection from said plurality of identifiers available for registration across said plurality of naming systems.

23. The method, as set forth in claim 21, further including contemporaneously registering from one of a subscriber profile and identifier watch list with said selection.

24. The method, as set forth in claim 5, wherein processing one of a first data request and second data request includes processing said search request with the first identifier, the first identifier including at least one keyword or phrase.

25. The method, as set forth in claim 24, wherein said processing said search request includes processing said search request with an automatic search function having one of a search template, identifier generation template, and registration template.

26. The method, as set forth in claim 24, wherein said processing said search request includes determining whether said keyword or phrase is a registered keyword or phrase, locating at least one network resource corresponding to the keyword or phrase in response to determining that said keyword or phrase is registered, determining whether to process a registration request for registering said keyword or phrase in response to determining that said keyword or phrase is not registered, and processing said registration request in response to determining that said keyword or phrase is to be registered.

27. The method, as set forth in claim 24, wherein said processing said search request includes generating at least one identifier other than that of a keyword from the first identifier, determining status for each said generated identifier, processing said search request having search results including access to said status of each said generated identifier.

28. The method, as set forth in claim 27, wherein said status of each said generated identifier is an available for registration status of a generated domain name.

29. The method, as set forth in claim 24, wherein one of a first identifier and second identifier is a domain name and said processing said search request includes determining whether said search request includes an identifier prefix, processing said prefix request in response to determining that said search request includes said identifier prefix.

30. The method, as set forth in claim 29, wherein said at least one identifier prefix is one of a Edit prefix for editing, Handle prefix for aliasing, List prefix for listing, Status prefix for obtaining status, History prefix for listing a history, Watch prefix for adding to a watch list, Renew prefix for renewing, Transfer prefix for transferring, Escrow prefix for escrowing, Consolidate prefix for consolidating, Auction prefix for auctioning, Bid prefix for bidding, Value prefix for valuating, Buy prefix for buying, Sell prefix for selling, Lease prefix for leasing, Generate prefix for generating, WHOIS prefix for obtaining contact information, Expire prefix for determining an expiry date, Registrar prefix for listing a corresponding domain name registration provider, Tools prefix for accessing technical information, Redirect prefix for redirecting, Lock prefix for locking, Email prefix for accessing e-mail services, WebHost prefix for accessing hosting services, Incorporate prefix for accessing business formation services, Trademark prefix for accessing trademark information, Geo prefix for accessing location information, and Dial prefix for accessing dialing services from said at least one identifier.

31. The method, as set forth in claim 5, wherein the first data request includes said search request, said registration request, and the first identifier and said processing one of a first data request and second data request includes processing said search request and said registration request from one of a first identifier and second identifier.

32. The method, as set forth in claim 1, further including inputting one of a first identifier, second identifier, first request type, and second request type from a user interface element.

33. The method, as set forth in claim 32, wherein said inputting said one of a first identifier, second identifier, first request type, and second request type from said user interface element includes inputting said one of a first identifier, second identifier, first request type, and second request type into one of a browser location field, text box, command line, and speech to text interface.

34. A device for processing a first data request having a first identifier and a first request type comprising:
   a processor;
   a memory in operative association with said processor;
   means for retrieving content from a computer network;
   means for determining whether the first data request can be processed from the first identifier and the first request type;
   means for processing the first data request in response to determining that the first data request can be processed;
   means for automatically selecting a response type having one of a first response method including the first identifier and a second request type, and a second response method including a second identifier and the first request type in response to determining that the first data request cannot be processed;
   means for generating a second data request that can be processed from said response type; and,
   means for processing said second data request.

35. A computer program product comprising computer readable program code stored on a computer readable medium, the program code adapted to execute a method for processing a first data request having a first identifier and a first request type including determining whether the first data request can be processed from the first identifier and the first request type, processing the first data request in response to determining that the first data request can be processed, automatically selecting a response type having one of a first response method including the first identifier and a second request type, and a second response method including a second identifier and the first request type in response to determining that the first data request cannot be processed, generating a second data request that can be processed from said response type, and processing said second data request.

* * * * *

UNITED STATES PATENT AND TRADEMARK OFFICE
CERTIFICATE OF CORRECTION

PATENT NO. : 6,760,746 B1
APPLICATION NO. : 09/653100
DATED : July 6, 2004
INVENTOR(S) : Eric Schneider Page 1 of 2

It is certified that error appears in the above-identified patent and that said Letters Patent is hereby corrected as shown below:

ON TITLE PAGE, please insert Item (63) and Item (60):

--Related U.S. Application Data

(63)   Continuation-in-part of U.S. patent application Ser. No. 09/650,827 filed Aug. 30, 2000, now U.S. Patent No. 6,901,436, and is a continuation-in-part of U.S. patent application Ser. No. 09/644,587 filed Aug. 23, 2000, now U.S. Patent No. 6,973,505, and is a continuation-in-part of U.S. patent application Ser. No. 09/643,584 filed Aug. 22, 2000, now U.S. Patent No. 7,010,568, and is a continuation-in-part of U.S. patent application Ser. No. 09/598,134 filed Jun. 21, 2000, now U.S. Patent No. 6,895,430, and is a continuation-in-part of U.S. patent application Ser. No. 09/532,500 filed Mar. 21, 2000, now U.S. Patent No. 7,136,932, and is a continuation-in-part of U.S. patent application Ser. No. 09/525,350 filed Mar. 15, 2000, now U.S. Patent No. 6,338,082.

(60)   U.S. provisional application Ser. No. 60/157,075 filed Oct. 1, 1999, U.S. provisional application Ser. No. 60/153,594 filed Sep. 13, 1999, U.S. provisional application Ser. No. 60/153,336 filed Sep. 10, 1999, U.S. provisional application Ser. No. 60/152,015 filed Sep. 1, 1999.--

At Column 1, Lines 6-22, please delete:

"This application claims the benefit of the following patent applications, which are hereby incorporated by reference: U.S. patent application Ser. No. 09/650,827 filed Aug. 30, 2000, U.S. patent application Ser. No. 09/644,587 filed Aug. 23, 2000, U.S. patent application Ser. No. 09/643,584 filed Aug. 22, 2000, U.S. patent application Ser. No. 09/598,134 filed Jun. 21, 2000, PCT Application No. 00/10883 filed Apr. 20, 2000, U.S. patent application Ser. No. 09/532,500 filed Mar. 21, 2000, U.S. patent application Ser. No. 09/525,350 filed Mar. 15, 2000, U.S. provisional application Ser. No. 60/175,825 filed Jan. 13, 2000, U.S. patent application Ser. No. 09/440,606 filed Nov. 15, 1999, U.S. patent application Ser. No. 60/157,075 filed Oct. 1, 1999, U.S. patent provisional application Ser. No. 60/153,594 filed Sep. 13, 1999, U.S. patent provisional application Ser. No. 60/153,336 filed Sep. 10, 1999, and U.S. provisional application Ser. No. 60/152,015 filed Sep. 1, 1999."

CERTIFICATE OF CORRECTION (continued)
U.S. Pat. No. 6,760,746 B1 and please insert the following:

--This application claims the benefit of the following patent applications, which are hereby incorporated by reference: this application is a continuation-in-part of U.S. patent application Ser. No. 09/650,827 filed Aug. 30, 2000, now U.S. Patent No. 6,901,436, and is a continuation-in-part of U.S. patent application Ser. No. 09/644,587 filed Aug. 23, 2000, now U.S. Patent No. 6,973,505, and is a continuation-in-part of U.S. patent application Ser. No. 09/643,584 filed Aug. 22, 2000, now U.S. Patent No. 7,010,568, and is a continuation-in-part of U.S. patent application Ser. No. 09/598,134 filed Jun. 21, 2000, now U.S. Patent No. 6,895,430, PCT Application No. 00/10883 filed Apr. 20, 2000, and is a continuation-in-part of U.S. patent application Ser. No. 09/532,500 filed Mar. 21, 2000, now U.S. Patent No. 7,136,932, and is a continuation-in-part of U.S. patent application Ser. No. 09/525,350 filed Mar. 15, 2000, now U.S. Patent No. 6,338,082, and claims the benefit of U.S. provisional application Ser. No. 60/175,825 filed Jan. 13, 2000, now abandoned, and claims the benefit of U.S. provisional application Ser. No. 09/440,606 filed Nov. 15, 1999, now U.S. Patent No. 6,442,549, and claims the benefit of U.S. provisional application Ser. No. 60/157,075 filed Oct. 1, 1999, now abandoned, and claims the benefit of U.S. provisional application Ser. No. 60/153,594 filed Sep. 13, 1999, now abandoned, and claims the benefit of U.S. provisional application Ser. No. 60/153,336 filed Sep. 10, 1999, now abandoned, and claims the benefit of U.S. provisional application Ser. No. 60/152,015 filed Sep. 1, 1999, now abandoned.--

Signed and Sealed this

Twenty-sixth Day of January, 2010

David J. Kappos
*Director of the United States Patent and Trademark Office*